(12) United States Patent
Sheddy et al.

(10) Patent No.: US 11,554,516 B2
(45) Date of Patent: Jan. 17, 2023

(54) TILE SAW

(71) Applicant: BLACK & DECKER INC., New Britain, CT (US)

(72) Inventors: Gregg L. Sheddy, Shrewsbury, PA (US); James D. Schroeder, Dallastown, PA (US); Peter Chaikowsky, Bel Air, MD (US); Darren B. Moss, Cockeysville, MD (US); Warren A. Ceroll, Owings Mills, MD (US); Stuart J. Wright, Timonium, MD (US); William D. Spencer, Ellicott City, MD (US); Jiangang Zhao, Baltimore, MD (US); William S. Taylor, Glen Rock, PA (US); Frank A. Mannarino, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 15/666,629

(22) Filed: Aug. 2, 2017

(65) Prior Publication Data

US 2017/0326755 A1 Nov. 16, 2017

Related U.S. Application Data

(63) Continuation of application No. 13/613,505, filed on Sep. 13, 2012, now Pat. No. 9,738,010, which is a
(Continued)

(51) Int. Cl.
*H02K 9/06* (2006.01)
*B23D 45/02* (2006.01)
(Continued)

(52) U.S. Cl.
CPC ............. *B28D 1/047* (2013.01); *B23D 45/02* (2013.01); *B23D 45/044* (2013.01);
(Continued)

(58) Field of Classification Search
CPC ......... B27B 25/10; B27B 27/00; B27B 27/02; B27B 27/08; B27B 27/10; B27B 5/222; B26D 7/0608; B26D 7/016; B23D 47/045
(Continued)

(56) References Cited

U.S. PATENT DOCUMENTS

| 1,511,797 A | 10/1924 | Berghold |
| 1,563,317 A | 12/1925 | Auel |

(Continued)

FOREIGN PATENT DOCUMENTS

| CN | 1253065 | 5/2000 |
| DE | 830270 | 2/1952 |

(Continued)

OTHER PUBLICATIONS

Frisch, Ulrich—Search Report of Jul. 1, 2009 re: European Patent Appln. No. 07102681.9—Munich.
(Continued)

*Primary Examiner* — Laura M Lee
(74) *Attorney, Agent, or Firm* — Rhonda Barton

(57) ABSTRACT

An angle guide assembly for being coupled to a table body that slides along a longitudinal axis relative to a base of a saw. The angle guide assembly includes an attachment member configured to attach the angle guide assembly to the table body; a guide body and an angled fence pivotally coupled to the guide body between a first orientation in which a workpiece can be placed at an angle to the longitudinal axis along a first guide surface of the guide body by placing the workpiece against the fence surface, and a second orientation in which a workpiece can be placed at an
(Continued)

angle to the longitudinal axis along a second guide surface of the guide body by placing the workpiece against the fence surface.

15 Claims, 17 Drawing Sheets

Related U.S. Application Data continuation of application No. 10/688,668, filed on Oct. 17, 2003, now Pat. No. 8,286,539.

(51) Int. Cl.
   - B23D 45/04 (2006.01)
   - B23D 47/02 (2006.01)
   - B28D 1/04 (2006.01)
   - B27B 27/10 (2006.01)
   - B27B 27/06 (2006.01)
   - H02K 7/14 (2006.01)

(52) U.S. Cl.
   CPC .......... *B23D 47/025* (2013.01); *B27B 27/06* (2013.01); *B27B 27/10* (2013.01); *H02K 7/14* (2013.01); *H02K 9/06* (2013.01); *Y10T 83/2066* (2015.04); *Y10T 83/242* (2015.04); *Y10T 83/263* (2015.04); *Y10T 83/283* (2015.04); *Y10T 83/293* (2015.04); *Y10T 83/647* (2015.04); *Y10T 83/6601* (2015.04); *Y10T 83/664* (2015.04); *Y10T 83/6608* (2015.04); *Y10T 83/6609* (2015.04); *Y10T 83/7697* (2015.04); *Y10T 83/7705* (2015.04); *Y10T 83/7726* (2015.04); *Y10T 83/8699* (2015.04); *Y10T 83/8773* (2015.04); *Y10T 83/95* (2015.04)

(58) Field of Classification Search
   USPC ............... 83/418, 421, 522.25, 471.2, 471.3,
         83/435.11–435.15, 468.1–468.3, 468.7,
         83/474, 438, 574, 581, 435.11–435.15,
         83/468.1–468.3, 468.1–468.3; 33/471
   See application file for complete search history.

(56) References Cited

U.S. PATENT DOCUMENTS

| | | | |
|---|---|---|---|
| 1,830,579 A | 11/1931 | Wappat | |
| 1,880,885 A | 10/1932 | Dittmar | |
| 1,923,853 A | 8/1933 | Van Duyn | |
| 1,926,828 A | 9/1933 | Van Berkel | |
| 2,000,667 A | 5/1935 | Osterholm | |
| 2,055,931 A | 9/1936 | Keely | |
| 2,173,587 A | 9/1939 | Huffman | |
| 2,246,761 A | 6/1941 | Saliba et al. | |
| 2,346,961 A | 4/1944 | Gundelfinger et al. | |
| 2,383,195 A | 8/1945 | Horman | |
| 2,411,641 A * | 11/1946 | Louis | B23Q 1/5412 |
| | | | 409/168 |
| 2,441,535 A | 5/1948 | Sanders | |
| 2,445,676 A | 7/1948 | Lasar | |
| 2,450,371 A | 9/1948 | Coates | |
| 2,450,601 A | 10/1948 | Lasar | |
| 2,589,251 A | 3/1952 | Heinz | |
| 2,624,984 A | 1/1953 | Zuzelo | |
| 2,691,398 A | 10/1954 | Klingens | |
| 2,693,207 A | 11/1954 | Berge | |
| 2,726,652 A | 12/1955 | Brittain | |
| 2,739,624 A | 3/1956 | Haddock | |
| 2,747,625 A | 5/1956 | Small | |
| 2,771,821 A * | 11/1956 | Beusch | B23Q 1/525 |
| | | | 269/59 |
| 2,774,131 A | 12/1956 | Crane | |
| 2,819,709 A | 1/1958 | MacGregor | |
| 2,863,440 A | 12/1958 | Harclerode | |
| 2,890,693 A | 6/1959 | Evans | |
| 2,895,515 A | 7/1959 | Ende | |
| 2,899,781 A | 8/1959 | Williams | |
| 2,913,926 A | 11/1959 | Hammond | |
| 2,941,554 A | 6/1960 | Long | |
| 3,007,499 A | 11/1961 | Dobslaw | |
| 3,108,349 A | 10/1963 | Takacs | |
| 3,265,450 A | 8/1966 | Aho | |
| 3,298,097 A | 1/1967 | Gilbert | |
| 3,299,608 A | 1/1967 | Orloff et al. | |
| 3,302,669 A | 2/1967 | Edler | |
| 3,336,177 A | 8/1967 | Beck | |
| 3,342,226 A | 9/1967 | Marcoux et al. | |
| 3,389,724 A | 6/1968 | Paul | |
| 3,476,161 A | 11/1969 | Dunlap | |
| 3,485,275 A | 12/1969 | Boudreau | |
| 3,538,964 A | 11/1970 | Warrick | |
| 3,621,829 A | 11/1971 | Maluck | |
| 3,635,206 A * | 1/1972 | Harclerode | B28D 1/047 |
| | | | 125/13.03 |
| 3,727,502 A | 4/1973 | Steinman | |
| 3,777,792 A | 12/1973 | Jameson | |
| 3,970,127 A | 7/1976 | Thiele | |
| 3,978,625 A | 9/1976 | Klaassen | |
| 4,055,206 A | 10/1977 | Griffin | |
| 4,096,789 A | 6/1978 | Blessinger | |
| 4,105,055 A | 8/1978 | Brenta | |
| 4,133,360 A | 1/1979 | Sanfilippo et al. | |
| 4,208,936 A | 6/1980 | Whitehouse | |
| 4,266,376 A | 5/1981 | Overy | |
| 4,280,472 A | 7/1981 | Cochran | |
| 4,315,494 A * | 2/1982 | DiPlacido | B28D 7/043 |
| | | | 125/13.01 |
| 4,350,193 A | 9/1982 | McCambridge et al. | |
| 4,378,716 A | 4/1983 | Volk | |
| 4,390,216 A | 6/1983 | Mueller et al. | |
| 4,428,159 A | 1/1984 | Sigetich et al. | |
| 4,497,353 A * | 2/1985 | Sproat, Jr. | B23Q 37/00 |
| | | | 142/53 |
| 4,510,980 A * | 4/1985 | Bartlett | B23D 47/025 |
| | | | 144/287 |
| 4,515,048 A | 5/1985 | Forsell | |
| 4,541,404 A | 9/1985 | Dols | |
| 4,553,284 A | 11/1985 | Strumbos | |
| 4,619,081 A | 10/1986 | Lipanski | |
| 4,660,450 A | 4/1987 | Rafalow | |
| 4,675,999 A | 6/1987 | Ito et al. | |
| 4,742,257 A | 5/1988 | Carpenter | |
| 4,778,315 A | 10/1988 | Duffy et al. | |
| 4,817,832 A | 4/1989 | Nagy | |
| 4,885,965 A | 12/1989 | Weissman | |
| 4,896,142 A | 1/1990 | Aycox et al. | |
| 4,920,845 A | 5/1990 | Blanchette | |
| 4,924,843 A * | 5/1990 | Waren | B28D 1/047 |
| | | | 125/35 |
| 4,929,130 A | 5/1990 | Diebolt et al. | |
| 4,938,387 A | 7/1990 | Kervefors et al. | |
| 4,940,067 A * | 7/1990 | Beard | B23Q 1/4804 |
| | | | 144/135.2 |
| 4,958,544 A | 9/1990 | Miyamoto | |
| 4,991,354 A | 2/1991 | Schweickhardt | |
| 5,046,707 A | 9/1991 | Allen | |
| 5,063,806 A | 11/1991 | Mayfield | |
| 5,084,972 A | 2/1992 | Waugh | |
| 5,146,682 A | 9/1992 | Bloechle et al. | |
| 5,161,590 A | 11/1992 | Otto | |
| 5,179,886 A | 1/1993 | Rathje, Jr. | |
| 5,190,421 A | 3/1993 | Wen et al. | |
| 5,263,620 A | 11/1993 | Hernandez et al. | |
| 5,311,090 A | 5/1994 | Ferlatte | |
| 5,372,536 A | 12/1994 | Bialek | |
| 5,381,602 A | 1/1995 | Matzo et al. | |
| 5,495,784 A | 3/1996 | Chen | |
| 5,577,428 A | 11/1996 | Rueb | |
| 5,634,274 A | 6/1997 | Ohkouchi et al. | |
| 5,651,727 A | 7/1997 | Weinstein et al. | |
| 5,660,094 A | 8/1997 | Sasaki et al. | |

(56) References Cited

U.S. PATENT DOCUMENTS

| | | | |
|---|---|---|---|
| 5,676,124 A | 10/1997 | Lee | |
| 5,701,676 A | 12/1997 | Itoh | |
| 5,746,193 A | 5/1998 | Swan | |
| 5,752,422 A * | 5/1998 | Inoue | B27B 27/00 83/468.3 |
| 5,884,681 A | 3/1999 | Nickles | |
| 5,901,270 A | 5/1999 | Quin | |
| 5,906,538 A | 5/1999 | Welch | |
| 5,931,073 A | 8/1999 | Hoyer-Ellefsen | |
| 5,937,924 A | 8/1999 | Cooper | |
| 5,980,167 A * | 11/1999 | Chen | B23Q 3/005 144/253.2 |
| 6,065,724 A | 5/2000 | Arslan et al. | |
| 6,073,529 A | 6/2000 | Shibata et al. | |
| 6,080,041 A | 6/2000 | Greenland | |
| 6,108,912 A | 8/2000 | Radigan | |
| 6,119,677 A | 9/2000 | Tebbe | |
| 6,199,608 B1 | 3/2001 | Ayala et al. | |
| 6,263,866 B1 | 7/2001 | Tsao | |
| 6,276,990 B1 | 8/2001 | Greenland | |
| 6,283,110 B1 | 9/2001 | Lee | |
| 6,286,823 B1 | 9/2001 | Morghen | |
| 6,347,624 B1 | 2/2002 | Smith et al. | |
| 6,412,380 B2 | 7/2002 | Belfiglio | |
| 6,460,818 B1 | 10/2002 | Garelick et al. | |
| 6,481,645 B1 | 11/2002 | Taylor-McCune et al. | |
| 6,672,188 B2 | 1/2004 | Lee | |
| 6,679,244 B1 | 1/2004 | Tsao | |
| 6,692,424 B2 | 2/2004 | Pasman et al. | |
| 6,745,803 B2 | 6/2004 | Sanfilippo | |
| 6,748,987 B2 | 6/2004 | Ayala et al. | |
| 6,752,139 B2 | 6/2004 | Lee | |
| 6,752,140 B1 | 6/2004 | Fuhrman et al. | |
| 6,845,768 B2 | 1/2005 | O'Banion et al. | |
| 6,927,509 B2 | 8/2005 | Cichetti, Sr. | |
| 7,044,039 B2 | 5/2006 | Powell | |
| 7,497,239 B2 | 3/2009 | Smith | |
| 7,775,718 B2 | 8/2010 | Kohl et al. | |
| 2001/0000856 A1 | 5/2001 | O'Banion | |
| 2001/0032534 A1 | 10/2001 | Ceroll et al. | |
| 2002/0007712 A1 * | 1/2002 | Hayashizaki | B23D 45/044 83/454 |
| 2002/0100353 A1 | 8/2002 | Lee | |
| 2002/0112582 A1 | 8/2002 | Young | |
| 2002/0124841 A1 | 9/2002 | O'Banion et al. | |
| 2003/0172918 A1 | 9/2003 | Governo | |
| 2008/0087153 A1 | 4/2008 | Lee | |

FOREIGN PATENT DOCUMENTS

| | | | |
|---|---|---|---|
| EP | 0291031 | 11/1988 | |
| FR | 2561570 | 9/1985 | |
| GB | 913651 A * | 12/1962 | B27B 25/10 |
| GB | 2128508 | 5/1984 | |
| JP | 06-270138 | 9/1994 | |
| JP | 08-296639 | 11/1996 | |
| WO | WO 99/34954 | 7/1999 | |
| WO | WO 02/100597 | 12/2002 | |

OTHER PUBLICATIONS

Frisch, Ulrich—Partial European Search Report—dated Jul. 5, 2005—Munich.

Annex to the European Search Report on European Patent Appln. No. 05/009,540.

Frisch, Ulrich—Partial European Search Report—dated Jan. 28, 2004—Munich.

* cited by examiner

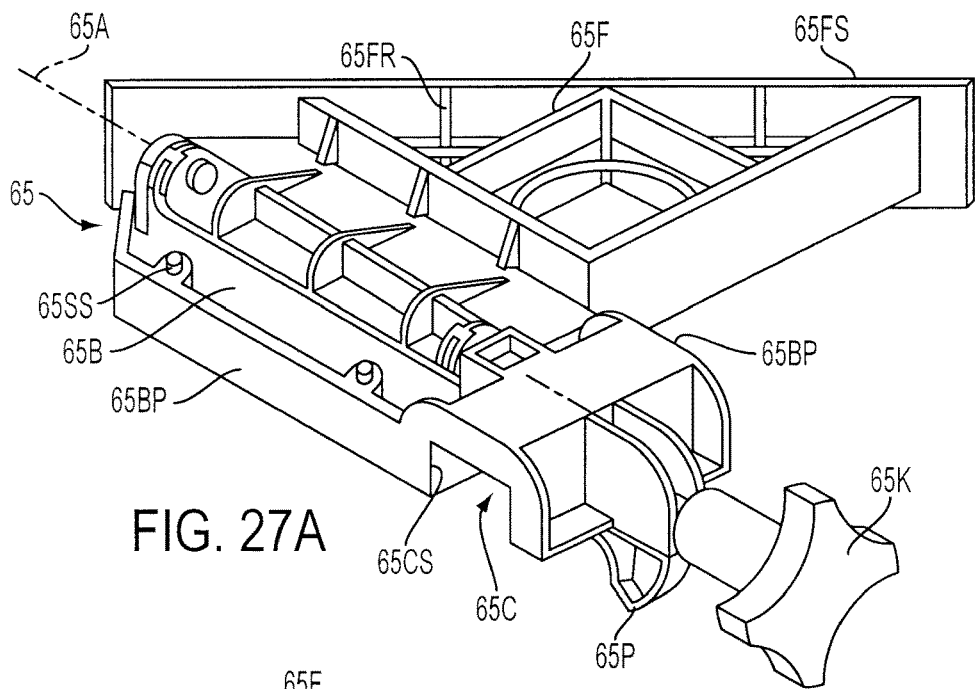
FIG. 27A
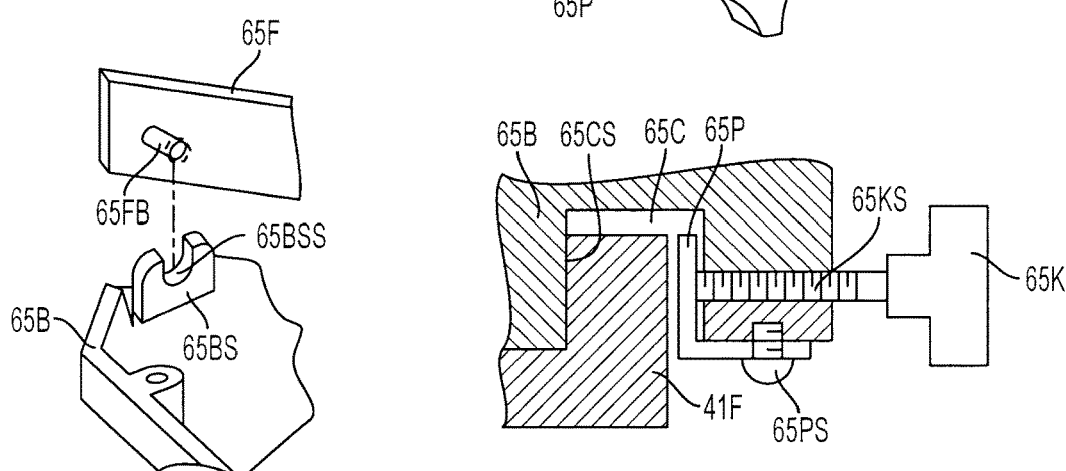
FIG. 27B
FIG. 28A
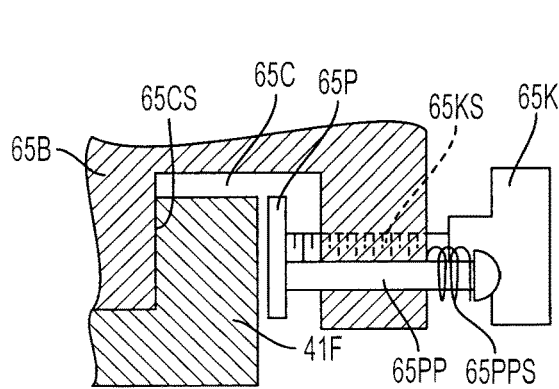
FIG. 28B
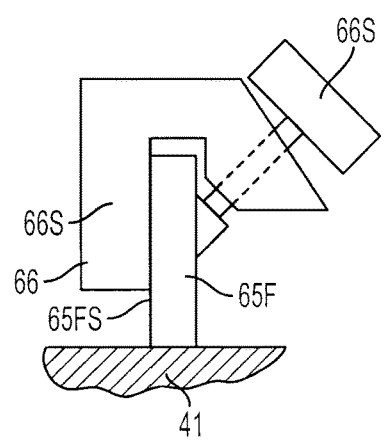
FIG. 29

TILE SAW

This application is a continuation of U.S. patent application Ser. No. 13/613,505, filed Sep. 13, 2012, which is a continuation of U.S. patent application Ser. No. 10/688,668, entitled "Tile Saw," filed Oct. 17, 2003, now U.S. Pat. No. 8,286,539, which claims the benefit of U.S. Provisional Application No. 60/423,335, filed Nov. 1, 2002, each of which are incorporated herein by reference.

FIELD OF THE INVENTION

This invention relates generally to tile or masonry saws and, more particularly, to tile saws with expanded capacity.

BACKGROUND OF THE INVENTION

A typical tile saw includes a base which supports a generally flat table top. A saw unit may be disposed on the base or table for cutting a workpiece, such as a tile or masonry brick, disposed on the table. However, the maximum cutting capacity of such tile saws is limited by the size of the machine, i.e., the envelope.

Accordingly, persons skilled in the art have devised a tile saw where the base has two tracks and the table has bearings or wheels riding on the tracks, so that the table can be slid relative to the saw unit for increased capacity. Such tile saws, however, are usually susceptible to dust collecting between the tracks and wheels, which creates binding between the base and the table. Ultimately, the binding may cause uneven, inaccurate cuts, which may translate into loss of time, materials and/or profit for the user.

Further, the capacity of such tile saws is usually limited to the length of the tracks. In other words, if a user wants increased capacity, he may have to lengthen the tracks. However, longer tracks may result in less portability of the tile saw.

It is therefore an object of this invention to provide a saw with increased cutting capacity without sacrificing portability.

SUMMARY OF THE INVENTION

In accordance with the present invention, an improved tile saw is employed. The saw comprises a base, a frame assembly disposed on the base, a first rail disposed on the frame assembly, the first rail having a longitudinal axis, a table slidingly disposed on the first rail, a support assembly disposed on the base, a saw assembly supported by the support assembly, the saw assembly comprising a motor, a cutting wheel driven by the motor, the saw assembly being pivotable about a horizontal axis substantially parallel to the longitudinal axis, and a switch electrically connected to the motor and disposed on the support assembly so that, when the motor assembly is pivoted about the horizontal axis, the switch remains stationary.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 3 illustrates a frame assembly according to the present invention, where

FIG. 5 illustrates a kerf fence assembly on a table assembly according to the present invention, where

FIG. 6 illustrates a first embodiment of the rail and table assemblies according to the present invention, where

FIG. 7 illustrates a detail of the rail and table assemblies of FIG. 6, where

FIG. 13 illustrates the arm and motor assemblies according to the present invention, where

FIG. 15 illustrates several embodiments of a depth stop mechanism according to the invention, where

FIG. 17 illustrates an adjustable guard assembly according to the present invention, where

FIG. 18 illustrates a fluid nozzle assembly according to the present invention, where

FIG. 20 illustrates the lower portion of the nozzle assembly, where

FIG. 24 illustrates the fluid direction mechanisms within the motor housing, where

FIG. 26 illustrates the cutting capacity of the tile saw according to the invention, where

FIG. 27 illustrates two alternate designs of an angle guide assembly, where FIGS. 27A-27B are a perspective view of the first design, and a partial exploded view of the second design, respectively;

FIG. 28 illustrates two alternate designs of the angle guide clamping mechanism, where FIGS. 28A-28B are partial cross-sectional views of the first and second designs, respectively;

FIG. 29 is a partial cross-sectional view of a first embodiment of a stop assembly for the angle guide clamping mechanism.

DETAILED DESCRIPTION

Figure 1:
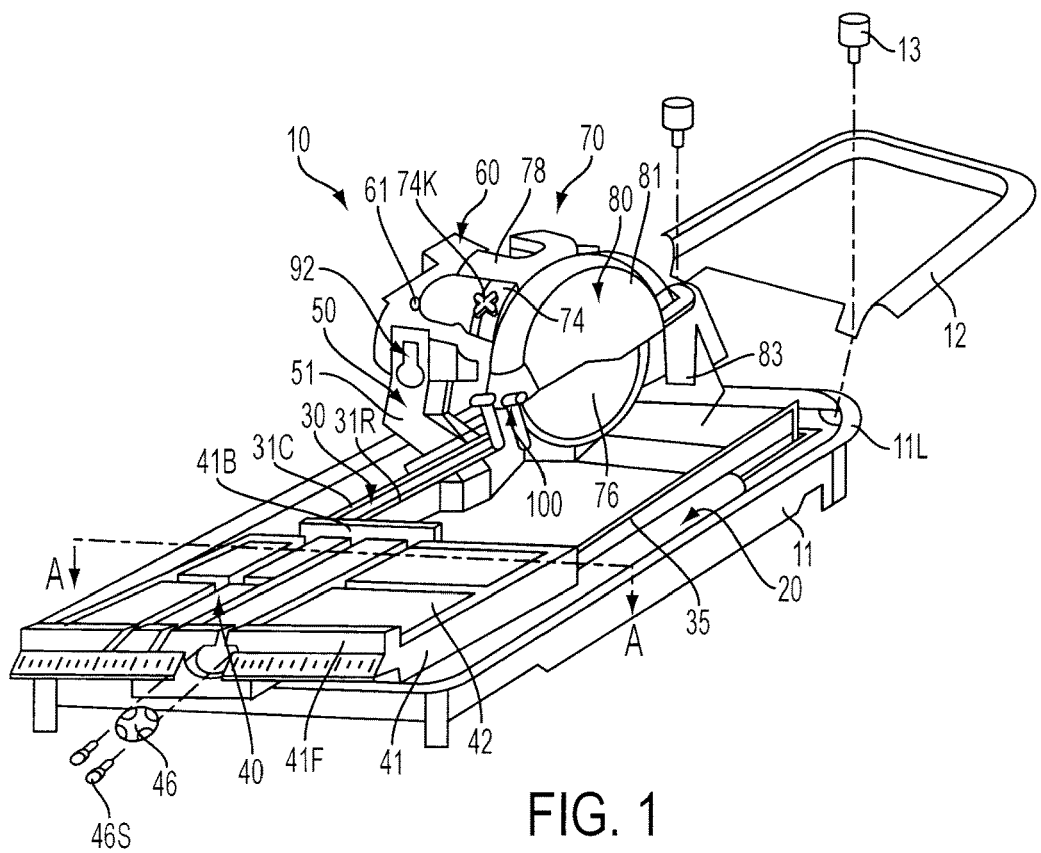
FIG. 1 is a front perspective side view of a tile saw according to the present invention.
Figure 2:
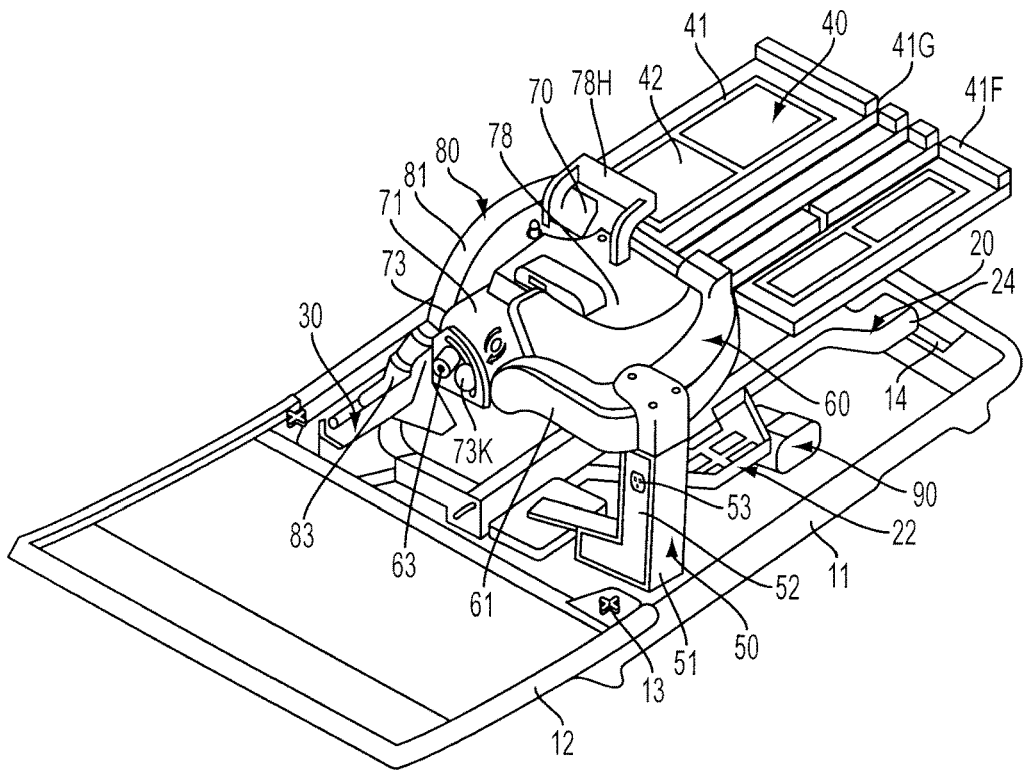
FIG. 2 is a rear perspective view of the tile saw illustrated in FIG. 1.

The invention is now described with reference to the accompanying figures, wherein like numerals designate like parts. FIGS. 1-2 illustrates a first embodiment of the present invention, where tile saw 10 comprises a base 11. A frame assembly 20 may be disposed on base 11. Frame assembly 20 may support rail assembly 30 and table assembly 40, which is movable along rail assembly 30. Frame assembly 20 may also support a column assembly 50, which in turn may support an arm assembly 60. Arm assembly 60 may support motor assembly 70, which includes a cutting wheel 76 for cutting a workpiece (not shown), such as tile, disposed on table assembly 40 and moved into contact with the cutting wheel 76.

Base 11 is preferably injection molded or vacuum formed as a tub for supporting the different elements of the tile saw 10 as described below. Base 11 may be made of polypropylene with calcium carbonate filler, such as Astryn 75A6-2 by Basell, HDPE (High Density Polyethylene) or ABS.

As is well known in the art, base 11 is preferably shaped as a tub to receive most, if not all, the water and slurry created during operation. A pump 90 is preferably disposed on base 11 to pump fluid out of base 11.

To maximize the amount of water and slurry received by base 11, it may be preferable to extend base 11 by providing extension pans. As shown in FIGS. 1-2, extension pan 12 can be attached to the rear of base 11 via thumbscrews 13. Alternatively, base 11 may have a lip 11L. Extension pan 12 may be shaped so that it is placed on or snapped unto lip 11L.

Persons skilled in the art will recognize that other extension pans may be attached to the sides or front of base 11. These extension pans are preferably injection molded or vacuum formed and made of ABS, styrene, polypropylene, or HDPE.

Figure 25:
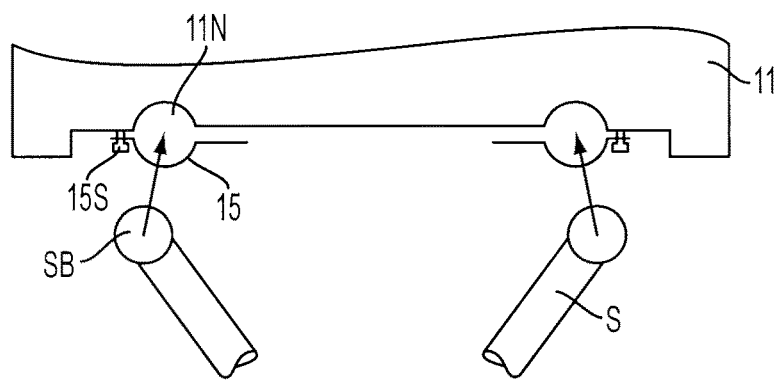
FIG. 25 is a partial side view of the tile saw supported by a stand.

Referring to FIG. 25, base 11 (and thus tile saw 10) may be supported by a stand S. Preferably, base 11 has at least one notch 11N that may extend through the entire width of base 11 or just through a portion of the width of base 11. Stand S has beams SB which are disposed within notches 11N. Preferably, the beams SB have a profile which matches the profile of notches 11N.

Persons skilled in the art should recognize that, if the stand S has a linkage that limits the distance between beams SB, one beam SB may be disposed within one notch 11N, while the other beam SB may just contact the underside of base 11.

A beam SB may be retained within notch 11N by a plate 15 which capture the beam SB. Preferably, plate 15 is attached to the base 11 via a screw 15S. Plate 15 may be rotated about the longitudinal axis of the screw 15S or about an axis substantially perpendicular to the longitudinal axis of the screw 15S to allow the user to insert beam SB into notch 11N. Once the beam SB is in place, the user can rotate plate 15 to its original position in order to capture beam SB.

Figure 3A:
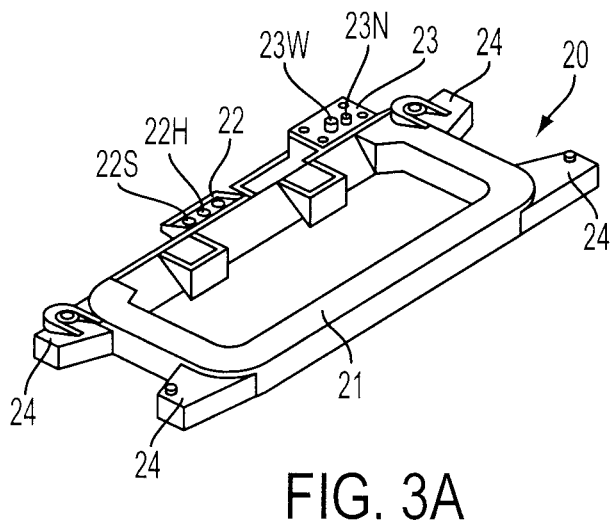
FIGS. 3A-3B are a perspective view and a close-up view of the frame assembly, respectively.
Figure 3B:
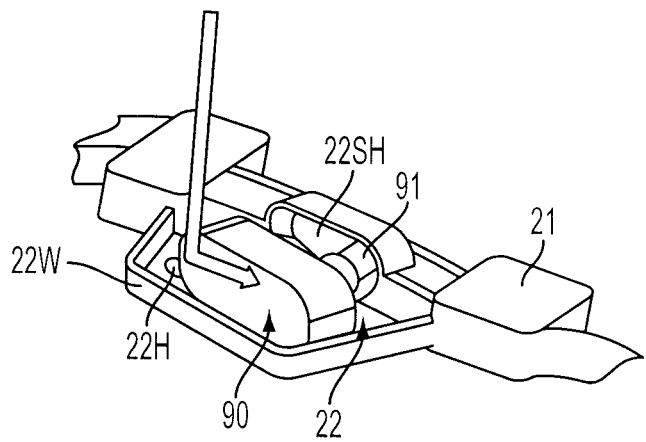
Figure 4:
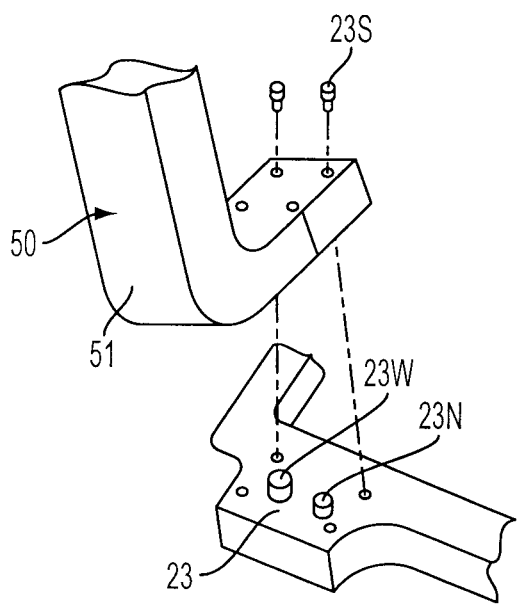
FIG. 4 is a partially exploded view of the frame and column assemblies according to the present invention.

Base 11 may support frame assembly 20. Referring to FIGS. 1-3, frame assembly 20 may have a body 21 with front and rear extensions 24. Base 11 may have notches 14 which receive extensions 24.

Preferably, frame assembly 20 is made of cast aluminum. Such material is advantageous as it reduces the flex caused by the tile saw components disposed thereon, providing a more accurate cut.

In addition, frame assembly 20 may have integral storage areas for storing tile saw components thereon. For example, frame assembly 20 may have a pump holder assembly 22 for holding pump 90 during transport. Pump holder assembly 22 may include a shelf 22S extending from body 21. Shelf 22S may have holes 22H thereon to allow fluid and slurry to fall therethrough. A wall 22W disposed around shelf 22S may retain pump 90 in place. It would also be preferable to provide a hole 22SH in a side wall of body 21 to allow the user to insert a stem protrusion 91 of pump 90 therein, in order to retain pump 90 more securely.

Referring to FIGS. 1-4 and 12, frame assembly 20 may support column assembly 50. Column assembly 50 may be made of cast aluminum and may have a body 51. Preferably, body 51 is screwed unto a support pad 23 of frame assembly 20 via screws 23S.

It is preferable to provide a means to ensure proper alignment between the column assembly 50 and frame assembly 20. Accordingly, posts 23W, 23N may be provided on support pad 23 and/or column body 51. These posts are received in corresponding holes in column body 51 and/or support pad 23. Preferably, post 23W is wider than post 23N. Accordingly, the user need only dispose body 51 unto support pad 23. The posts 23W, 23N (and the corresponding holes) enable the user to quickly locate the proper position of column assembly 50 relative to frame assembly 20. Once located, the user need only affix column assembly 50 to frame assembly 20 via screws 23S.

Persons skilled in the art will recognize that the holes receiving posts 23W, 23N are preferably close tolerance holes. In order to allow both posts 23W, 23N to fit in both holes, some side-to-side allowance for one of the holes should be provided. This side-to-side allowance could be achieved by making one of the holes into a slot, or shaping one post as a diamond, in a similar manner as post 51D, discussed below.

Referring to FIGS. 1-2 and 6-7, frame assembly 20 may support rail assembly 30. Rail assembly 30 in turn preferably supports table assembly 40. A first embodiment of rail assembly 30 may include a first rail 31 and a second rail 35, both rails being preferably supported by frame assembly 20. Both first and second rails 31, 35 may be made of extruded or cast aluminum.

First rail 31 is preferably fixed to frame assembly 20 via a bolt and nut combination 32. First rail 31 may have a first portion 31C which is substantially C-shaped cross-section throughout a major portion, if not all, of its entire length. In addition, first rail 31 may include a second portion 31P which includes a rail or rod 31R. First and second portions 31C, 31P may be interconnected. Preferably rod 31R lies outside of the first portion 31C.

Second rail 35 is preferably fixed to frame assembly 20 via a bolt and nut combination 34. Second rail 35 preferably has a substantially L-shaped or C-shaped cross-section throughout a major portion, if not all, of its entire length.

Table assembly 40 is preferably movably connected to rail assembly 30. Table assembly 40 includes a table body 41 having at least one groove 41G. Table body 41 may be made of cast aluminum. Table body 41 may have rubber portions 42 overmolded thereon to protect a workpiece placed on table assembly 40.

Figure 8:
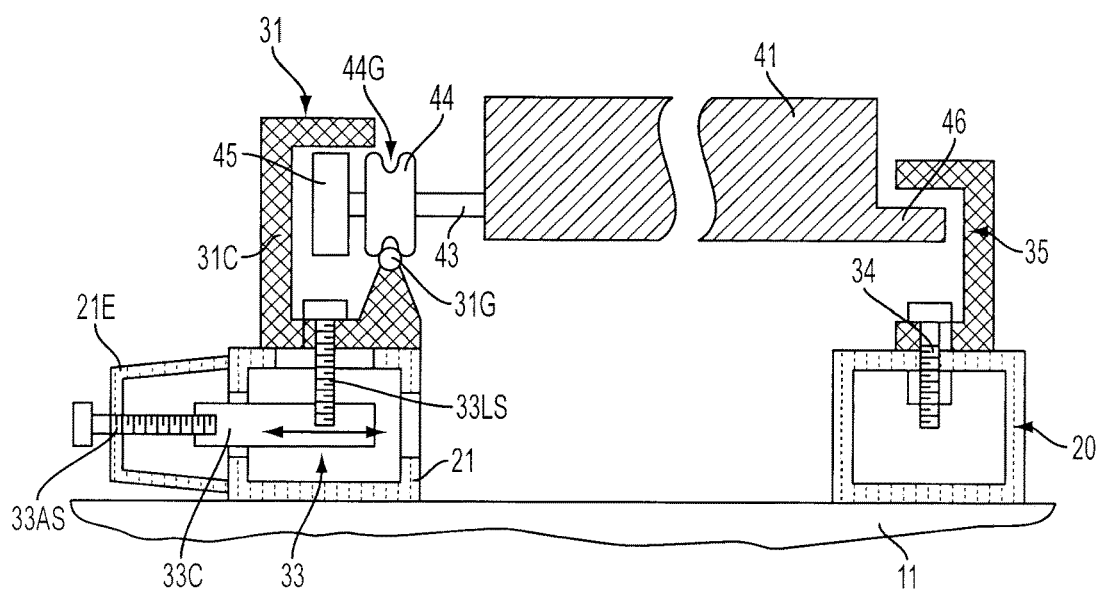
FIG. 8 is a partial cross-sectional view (taken along line A-A of FIG. 1) of a second embodiment of the rail and table assemblies according to the present invention.

Table assembly 40 may also include several shafts 43 connected to table body 41. Shafts 43 may be fixedly attached to table body 41 (as shown in FIG. 8). Alternatively, shafts 43 may be supported by bearings 43B disposed between table body 41 and shafts 43. Bearings 43B may be ball or roller bearings.

A wheel 44 may be disposed on shaft 43. Bearings may be disposed between wheel 44 and shaft 43. Preferably, two bearings are pressed into each wheel 44. In addition, a bearing 45 may be disposed on shaft 43. Bearing 45 may be a rotatable roller or a non-rotatable element which may be polygonnally shaped. Preferably, shafts 43, wheels 44 and bearings 45 are disposed on one side of the table body 41.

Figure 6A:
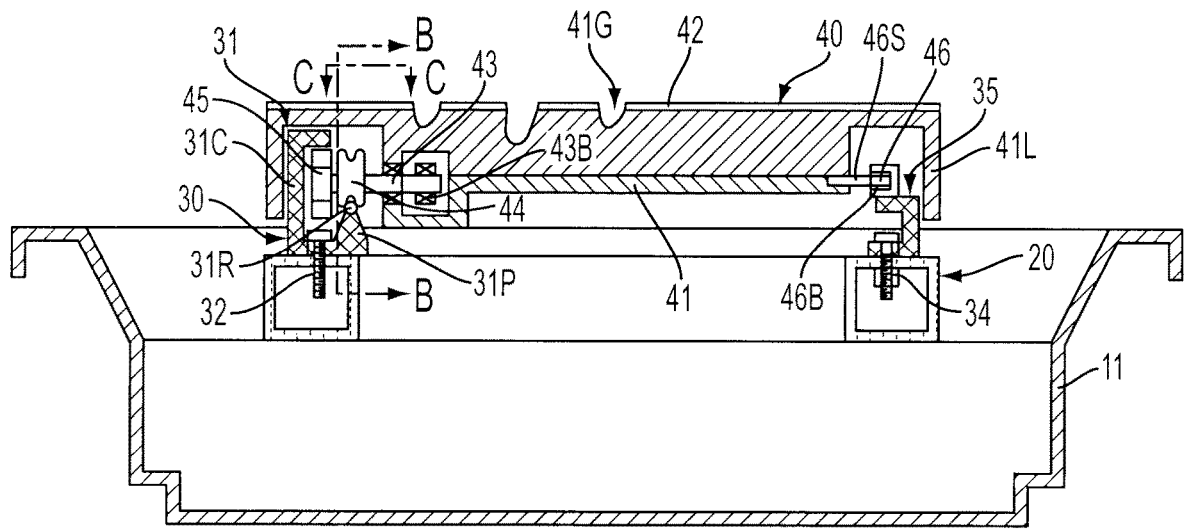
FIGS. 6A-6C are partial cross-sectional views along line A-A of FIG. 1, and lines B-B and C-C of FIG. 6A, respectively.

At least one bearing 46 may be disposed on the other side of table body 41. Bearing 46 may be a rotatable roller, as shown in FIG. 6A. Bearing 46 may be disposed on a shaft 46S connected to table body 41. Shaft(s) 46S may be fixedly attached to table body 41. Alternatively, shaft(s) 43 may be supported by bearings disposed between table body 41 and shafts 43. Bearings 43B may be ball or roller bearings.

Bearings 46B may be disposed between bearing 46 and shaft 46S. Preferably, two bearings 46B are pressed into each bearing 46.

Bearing 46 preferably rides on second rail 35.

Alternatively, bearing may be a non-rotatable element, such as linear bearing 49 shown in FIG. 8. Such linear bearing may ride on second rail 35 or travel underneath second rail 35 so that the user cannot pull up such end beyond second rail 35.

With such arrangement, the table assembly 40 may be slidably disposed on rail assembly 30 along a longitudinal axis X (as shown in FIG. 1) defined by rail assembly 30. In particular, wheels 44 may be disposed on rod 31R, while bearings 45, 46 are disposed within first portion 31C and second rail 35, respectively.

Preferably, wheels 44 and bearings 45 support most, if not all, of the weight of the table body 41. In the present arrangement, table body 41 preferably pivots about the contact between rod 31R and wheels 44. Referring to FIG. 6A, as table body 41 rotates in a clockwise direction, bearings 45 contact the inside portion of first portion 31C.

Table body 41 may thus be moved in a direction parallel to the longitudinal axes of first and second rails 31, 35. When table body 41 is moved accordingly, wheels 44 rotate about and/or with shafts 43, while bearings 45 slide along first portion 31C.

This arrangement is especially advantageous as it allows the user to move the table assembly 40 beyond the ends of rail assembly 30, as shown in FIGS. 1-2. Persons skilled in the art will recognize that, as each wheel 44 moves beyond the front end of rod 31R (except for one or two of the rearmost wheels 44), bearings 45 will contact the inside, upper portion of the first portion and second rail 31C, 35, to support the table assembly 40 in a first cantilevered position. Similarly, persons skilled in the art will recognize that, as each wheel 44 moves beyond the rear end of rod 31R (except for one or two of the fowardmost wheels 44), bearings 45, 46 will contact the inside, upper portion of the first portion and second rail 31C, 35, to support the table assembly 40 in a second cantilevered position.

Figure 26A:
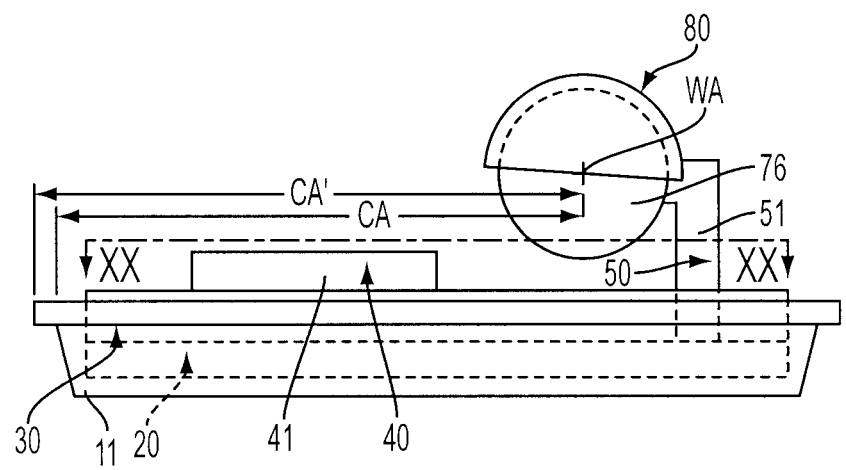
FIGS. 26A-26B are side and a partial top view along line XX of FIG. 26A, respectively.
Figure 26B:
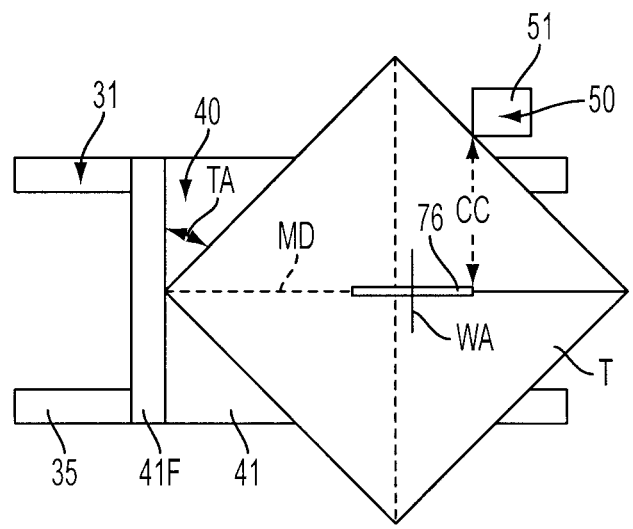

Having the ability to move the table assembly 40 into at least one of the first and second cantilevered positions allows for a longer movement range of table assembly 40, which in turn results in an extended cutting capacity without increasing the length of the rail assembly 30 and/or base 11. For example, the tile saw shown in FIG. 26 may have a cutting wheel 76 with a diameter of about 10 inches, a distance CA between the wheel axis WA and the front of base 11 of about 60.56 centimeters (or a distance CA' between the wheel axis WA and the front of base 11, including lip 11L, of about 62.18 centimeters), and a distance CC between the column body 51 and the plane containing cutting wheel 76 of about 33.4 centimeters, may cut a workpiece T about 25 inches (63.5 centimeters) long disposed on table body 41 at a workpiece angle TA of 0° in one pass. The same tile saw could also cut a square workpiece T having sides of about 24 inches along its major diagonal MD (i.e., workpiece T being disposed at a workpiece angle TA of 45°) in two passes.

Persons skilled in the art should also recognize that table assembly 40 can only be inserted into and/or removed from rail assembly 30 by moving table assembly in a direction parallel to the longitudinal axes of first and second rails 31, 35. It may be desirable to provide first portion 31C and second rail 35 with openings on their respective upper portions to allow the user to lift off table saw assembly 40 when bearings 45, 46 are aligned with said openings. Persons skilled in the art will recognize that multiple sets of openings can be provided on first portion 31C and second rail 35 so that the user can lift off table saw assembly 40 at multiple locations.

Table body 41 may have downwardly extending lips 41L, which preferably partially cover first and/or second rails 31, 35. This may limit the amount of fluid and/or slurry that enters first and/or second rails 31, 35.

Figure 6B:
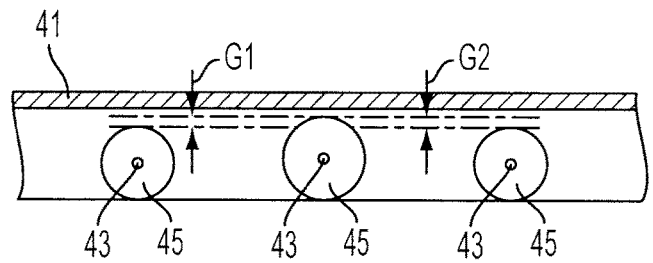
Figure 6C:
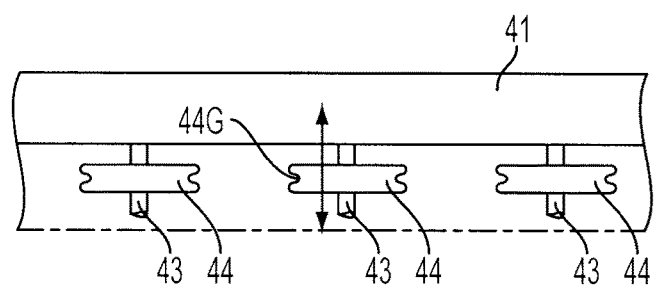

Referring to FIG. 6C, it is preferable to make at least one of wheels 44 axially movable relative to its shaft 43. This ensures a better alignment between the wheels 44 and rod 31R. Preferably, the center wheel(s) 44 will be axially movable. Another advantage of providing such adjustability is that, if wheels 44 have grooves 44G for riding on rod 31R, the width of the grooves 44G can be minimized regardless of the manufacturing tolerances. This in turn may minimize any sideways wobble of the table assembly 40 when it is in a cantilevered position, thus providing a better quality cut.

Referring to FIG. 6B, it is preferable to provide a height differential between bearings 45 to prevent binding during sliding. For example, in a table assembly 40 having three bearings 45, the center bearing may be disposed a tad higher than the rearmost bearing, creating a height differential G1. Similarly, the center bearing may be disposed a tad higher than the forwardmost bearing, creating a height differential G2. Preferably, height differentials G1, G2 are substantially equal and are preferably between about 1 mm and about 5 mm.

Figure 7A:
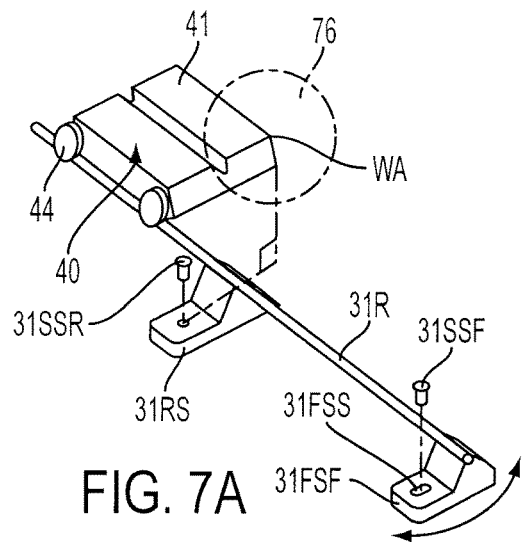
FIGS. 7A-7B are a partial perspective view and a partial top plan view, respectively.
Figure 7B:
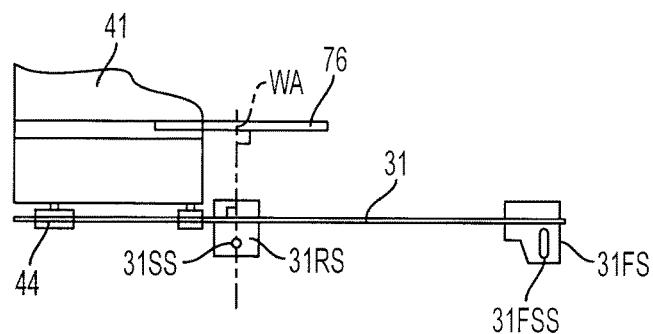

It is preferable to provide a method for adjusting the rail assembly 30 so that table assembly 40 moves in a direction substantially parallel to the cutting wheel 76. Referring to FIG. 7, rod 31R is supported by front and rear supports 31FS, 31RS, respectively. Screws 31SSF, 31SSR preferably attach corresponding front and rear supports 31FS, 31RS to frame assembly 20. Preferably, rear support 31RS (and thus rod 31R) can pivot about screw 31SSR, whereas front support 31FS has a slot 31FSS to allow such pivoting action. Screw 31SSR is preferably aligned with the rotating axis WA of cutting wheel 76. Persons skilled in the art will recognize that screw 31SSR may be replaced by a pin, cast boss, etc., so long as rod 31R can only be pivoted about one axis, which is aligned with rotating axis WA.

Persons skilled in the art will recognize that this adjustment mechanism may also be used with second rail 35. In addition, persons skilled in the art should recognize that, while only rod 31R is being shown in FIG. 7, the entire first rail 31 is adjustable as it is connected to rod 31R.

FIG. 8 illustrates another adjustment mechanism 33 that can be used for pivoting first rail 31 about one pivot axis (if the first rail 31 pivots about one axis and has one adjustment mechanism 33), or for adjusting first rail 31 at multiple locations throughout its length (if multiple adjustment mechanisms 33 are provided). Basically, adjustment mechanism 33 may include an adjustment screw 33AS, a cylinder 33C threadingly engaged to the adjustment screw 33AS, and a locking screw 33LS extending through first portion 31C, frame body 21 and threadingly engaging cylinder 33C. Adjustment screw 33AS preferably threadingly engages frame body 21 or an extension 21E thereof.

To adjust the alignment of first rail 31, the user needs to loosen locking screw 33LS and then rotate adjustment screw 33AS. As adjustment screw 33AS is rotated, it horizontally moves cylinder 33C (and thus first rail 31). When the desired position is obtained, the user can fix the position of first rail 31 by just tightening locking screw 33LS, which urges first portion 31C against frame body 21.

Referring to FIGS. 1-2 and 5, as table assembly 40 is moved towards cutting wheel 76, cutting wheel 76 cuts a workpiece T disposed on table body 41 and extends below the top surface of table body 41 into one of the grooves 41G disposed thereon. Table body 41 may have an upwardly extending fence 41F for supporting workpiece T as it is being moved into and/or cut by cutting wheel 76.

In order to avoid cutting wheel 76 cutting into table body 41, it is typical to widen grooves 41G. However, such wider grooves 41G do not indicate the user where the workpiece T will be cut. Accordingly, it is preferable to provide a means to indicate the cutting path of cutting wheel 76, i.e., where the workpiece T will ultimately be cut.

Figure 5A:
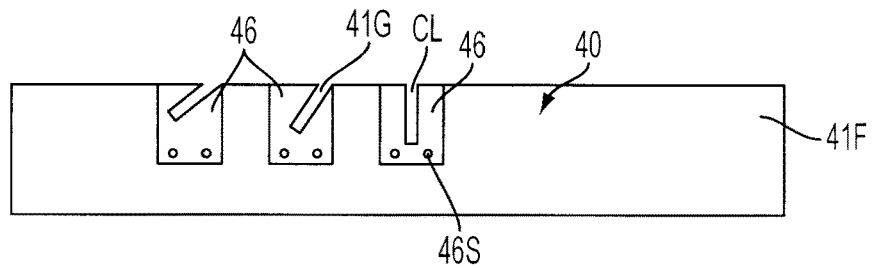
FIGS. 5A-5C are front views of the first, second and third embodiments, respectively.

One such means is shown in FIG. 5A. Basically, an insert 46 is disposed on fence 41F to cover groove 41G. During manufacture or assembly, the table assembly 40 is slid towards cutting wheel 76, until insert 46 is cut by cutting wheel 76. Insert 46 will thus have a cut line CL showing where the cutting wheel 76 cuts through. This allows the user to align the workpiece T to the cutting wheel 76.

Preferably, insert 46 is made of a material that does not damage the cutting wheel 76 or melt upon contact with the cutting wheel 76. Accordingly, insert 46 may be made of phenolic plastic or any other suitable material, such GE Noryl PPO.

It is preferable to design insert 46 so that it can be removed for replacement. Accordingly, insert 46 is preferably attached to fence 41 via screws 46S.

Figure 5B:
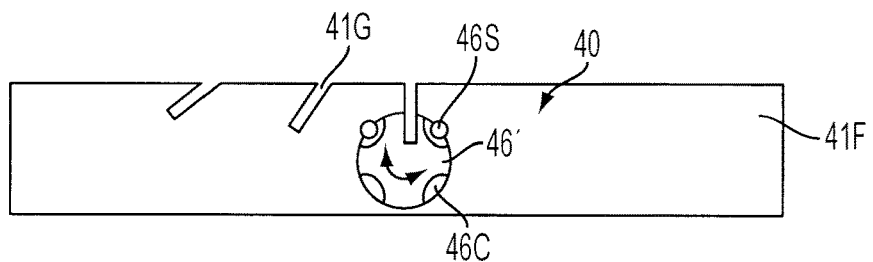

An alternate design of insert 46 is shown in FIGS. 1 and 5B, where like numerals refer to like parts, and where the teachings of the previous embodiment are wholly incorporated herein. In this embodiment, insert 46' is substantially cylindrical and inserted into fence 41F. Insert 46' may have portions 46C of decreased width, which can contact the screws 46S. Having a substantially cylindrical insert 46' is advantageous as the insert 46' can be rotated to an uncut portion when necessary or desired, rather than requiring a full replacement every time.

Figure 5C:
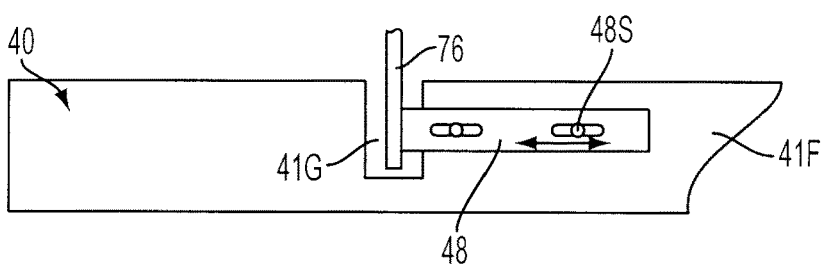

FIG. 5C illustrates another means for indicating the cutting wheel. In this embodiment, an element 48 is slidably attached to fence 41F. When the table assembly 40 is moved towards the cutting wheel 76, the user can slide element 48 against or close to cutting wheel 76 and fix its location by tightening screws 48S. The leftmost edge will thus indicate the cutting path of cutting wheel 76.

While it is not necessary to cut element 48, some users may still desire to do so. Accordingly, it is preferable to make element 48 of a material that does not damage the cutting wheel 76 or melt upon contact with the cutting wheel 76. Accordingly, element 48 may be made of phenolic plastic or any other suitable material, such GE Noryl GPS.

Figure 5D:
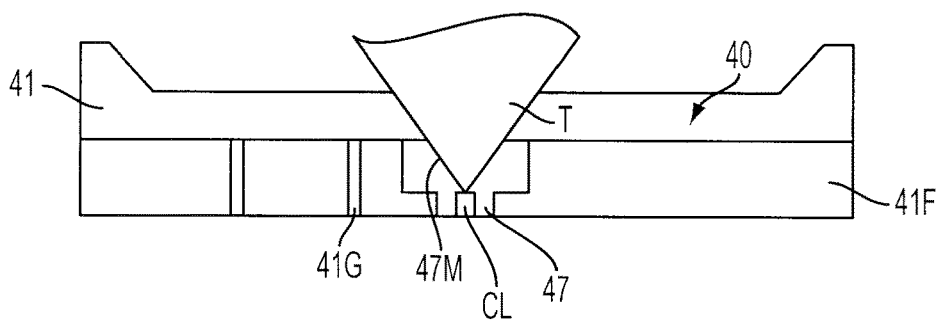
FIG. 5D is a partial top plan view of the fourth embodiment according to the present invention.

Referring to FIG. 5D, an insert 47 may be disposed on fence 41F. The teachings of the previous embodiments are incorporated herein. Insert 47 is advantageous as, in addition to indicating the cutting path via cut line CL, it has two inclined edges 47M, allowing the user to place workpiece T in a mitered position. Preferably, the two inclined edges 47M are substantially perpendicular. In addition, each inclined edge 47M forms an angle of 45° with the cut line CL, so that the user can cut diagonally through a square tile.

Figure 9:
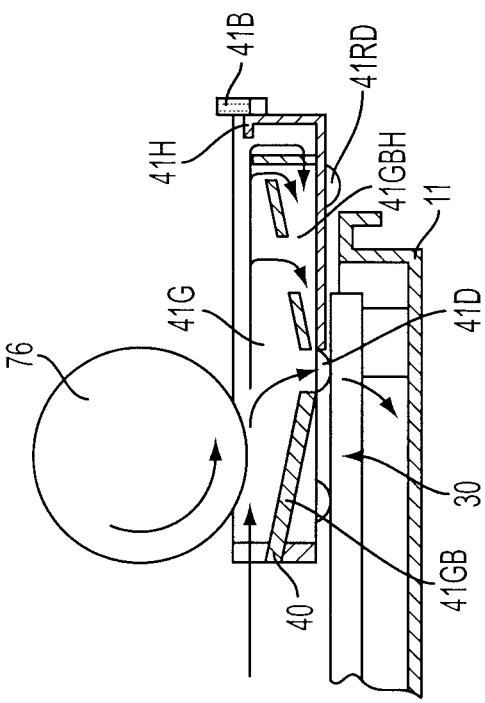
FIG. 9 is a partial cross-sectional view of a table assembly according to the present invention.

As mentioned above, table body 41 preferably has grooves 41G. Referring to FIG. 9, grooves 41G may have a bottom wall 41GB, which slopes downwardly from the front and rear ends of table body 41 to the center of table body 41. Fluid and/or slurry generated during the cutting operation may exit table body 41 through a drain hole 41D provided at the center of bottom wall 41GB. It is preferable to provide drain hole 41D near the center of table body 41 so that drain hole 41D can drain into base 11 regardless of whether table body 41 is within the envelope of base 11 or whether table body 41 is in the front and/or rear cantilevered positions.

Alternatively, fluid and/or slurry generated during the cutting operation may exit table body 41 through holes 41GBH, which in turn may drain into a draining pan 41RD. Draining pan 41RD preferably has a bottom wall which slopes downwardly from the rear end of table body 41 towards the drain hole 41D. The fluid and/or slurry exiting through drain hole 41D ends up in base 11.

Draining pan 41RD may also have a substantially horizontal baffle 41H disposed below the top surface of table body 41 and cutting wheel 76. Baffle 41H would catch some of the fluid and/or slurry that is thrown rearwardly due to the rotation of the cutting wheel 76 and redirect such fluid and/or slurry into the draining pan 41RD.

Table body 41 may also have a brush 41B at the rearward and/or forward ends of grooves 41G to help limit the flow of fluid and/or slurry beyond the brush 41B and/or grooves 41G. Preferably, the brush 41B has bristles made of nylon or a synthetic rubber-like material.

Figure 10:
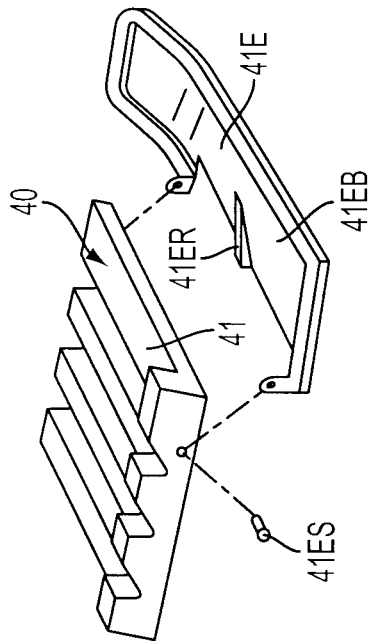
FIG. 10 is a perspective view of a table assembly with a first embodiment of a collector assembly according to the present invention.

Referring to FIG. 10, it is preferable to provide table assembly 40 with an extension pan assembly 41E which can further assist in redirecting fluid and/or slurry generated during the cutting operation into base 11. In particular, extension pan assembly 41E can be attached to table body 41 via screws 41ES. Extension pan assembly 41E preferably has a bottom wall 41EB which preferably extends downwardly from its outermost edge towards table body 41. A rib 41ERR may help separate bottom wall 41EB from table body 41. Extension pan assembly 41E may be blow molded, injection molded or vacuum formed and may be made of ABS, styrene, polypropylene, or HDPE.

Figure 11:
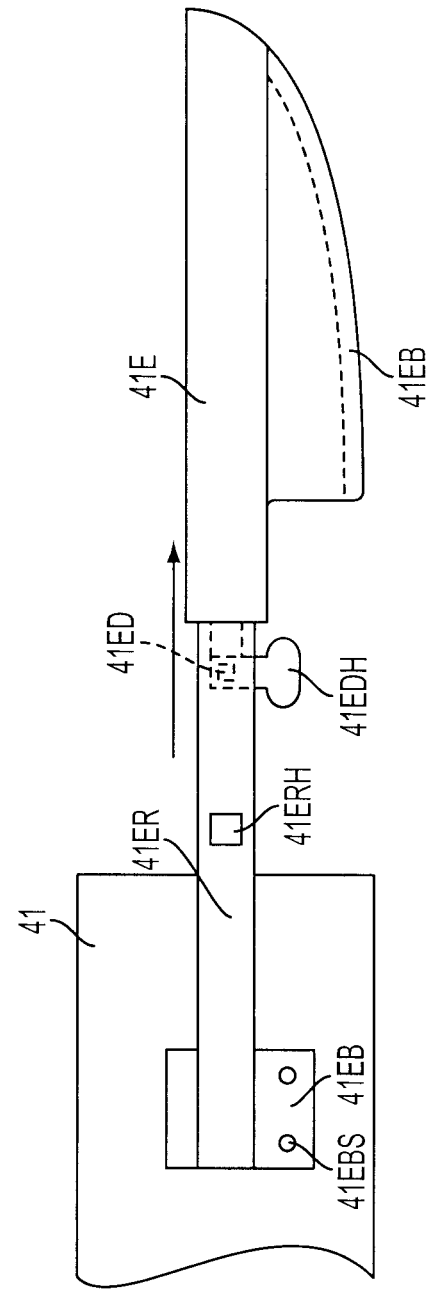
FIG. 11 is a front view of a table assembly with a second embodiment of a collector assembly according to the present invention.
Figure 12:
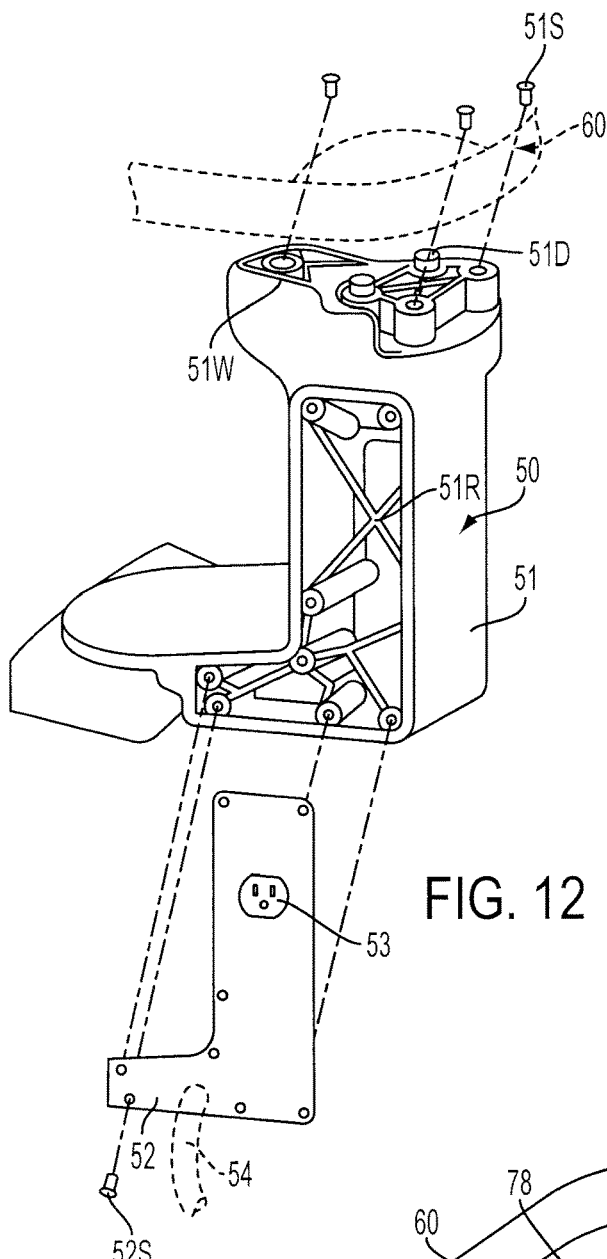
FIG. 12 is a partially exploded view of the column assembly according to the present invention.

FIG. 11 illustrates an alternate embodiment of extension pan assembly 41E, where like numerals refer to like parts. The teachings of the previous embodiment are wholly incorporated herein. The main difference between the previous and present embodiment is that the extension pan assembly 41E is fixed in the previous embodiment, whereas the extension pan assembly 41E is movable.

In the present embodiment, extension pan assembly 41E is slidably attached to rod 41ER, which in turn is fixed to table body 41 via a bracket 41EB and screws 41EBS. Rod 41ER may have holes 41ERH which can receive a detent 41ED which is connected to extension pan assembly 41E. Preferably detent 41ED is biased towards holes 41ERH. A handle 41EDH can move detent 41ED away from hole 41ERH to allow movement of extension pan assembly 41E. in an embodiment, extension pan assembly 41E is moveable in a direction Y that is substantially perpendicular to the longitudinal axis X defined by rail assembly 30 (see also FIG. 1).

Referring to FIGS. 27-30, an angle guide assembly 65 may be attached to table body 41 to help guide a workpiece T disposed on table body 41 into cutting wheel 76. Angle guide assembly 65 may have a guide body 65B that is disposable on table body 41. Preferably, guide body 65B is clamped unto fence 41F.

Guide body 65B may have a clamping channel 65C which receives fence 41F. Clamping channel 65C may include a surface 65CS which is preferably substantially parallel to fence 41F. Guide body 65B may also include a movable plate 65P which is moved into contact against fence 41F for sandwiching the fence 41F between surface 65CS and plate 65P. Plate 65P may be moved in by a knob 65K which is preferably attached to a screw 65KS, which in turn is preferably threadingly engaged to guide body 65B and may contact plate 65P.

As shown in FIG. 28A, plate 65P may be attached to guide body 65B via screws 65PS. In such case, plate 65P is preferably made of spring steel, so that screw 65KS is loosened, plate 65P moves away from fence 41F.

Alternatively, plate 65P may just be connected to a shaft or screw 65PP, which extends into and/or through guide body 65B, as shown in FIG. 28B. A spring 65PPS captured between screw 65PP and guide body 65B may bias plate 65P away from fence 41F, so that screw 65KS is loosened, plate 65P moves away from fence 41F.

Guide body 65B may have a surface 65BP on one side thereof, and preferably two surfaces 65BP on both sides thereof. Surfaces 65BP are preferably substantially perpendicular to surface 65CS. Accordingly, guide body 65B can be attached to table body 41 and a workpiece T can be disposed against fence 41F and surface 65BP. Persons skilled in the art will recognize that, if two surfaces 65BP are provided on both sides of guide body 65B, the user could rest a workpiece T against a surface 65BP regardless on which side of groove 41G the guide body 65B is disposed.

Angle guide assembly 65 may also have an angled fence 65F. Angled fence 65F may be pivotably attached to guide body 65B, as shown in FIG. 27A, so that it can be pivoted to either side of guide body 65B. Preferably, angled fence 65F is pivotable about an axis 65A which is substantially parallel to surfaces 65BP and/or substantially perpendicular to surface 65CS.

Alternatively, angled fence 65F may be removably disposed on guide body 65B, as shown in FIG. 27B. In this case, angled fence 65F would include a boss 65FB, which can be slid into a slot 65BSS of support wall 65BS. The user can thus remove angle fence 65F, rotate it, and disposed on the other side of guide body 65B by sliding boss 65FB into slot 65BSS. Persons skilled in the art will recognize that angled fence 65F may have two bosses 65FB received into rear and front slots 65BSS of guide body 65B.

Angled fence 65F has a surface 65FS which is preferably substantially perpendicular to the support surface of table body 41, though persons skilled in the art will recognize that surface 65FS may be angled relative to table body 41. In addition, surface 65FS is preferably angled relative to axis 65A and/or surfaces 65BP. Preferably, surface 65FS is disposed at an angle of 45° relative to axis 65A and/or surfaces 65BP, so that the user can support a workpiece T disposed on table body 41 at an angle.

Persons skilled in the art will recognize that providing an angled fence 65F that can be moved between both sides of guide body 65B will enable the user to support a workpiece T disposed on table body 41 at an angle regardless of which side of groove 45G guide body 65B is disposed.

Angled fence 65F may have support ribs 65FR for added strength and/or stability.

Guide body 65B may also carry set screws 65SS for properly aligning the surface 65FS relative to table body 41 and/or surfaces 65BP.

It may be advantageous to provide a stop assembly on angled fence 65F which location the user can fix so that the user can set a desired cut and easily make this cut multiple times. One embodiment of such stop assembly is shown in FIG. 29, where stop assembly 66 is disposed on angled fence 65F. Stop assembly 66 may have a surface 66S which is preferably substantially perpendicular to surface 65FS. Preferably, the location of stop assembly 66 is fixed relative to angled fence 65F via a screw 66S.

Figure 30:
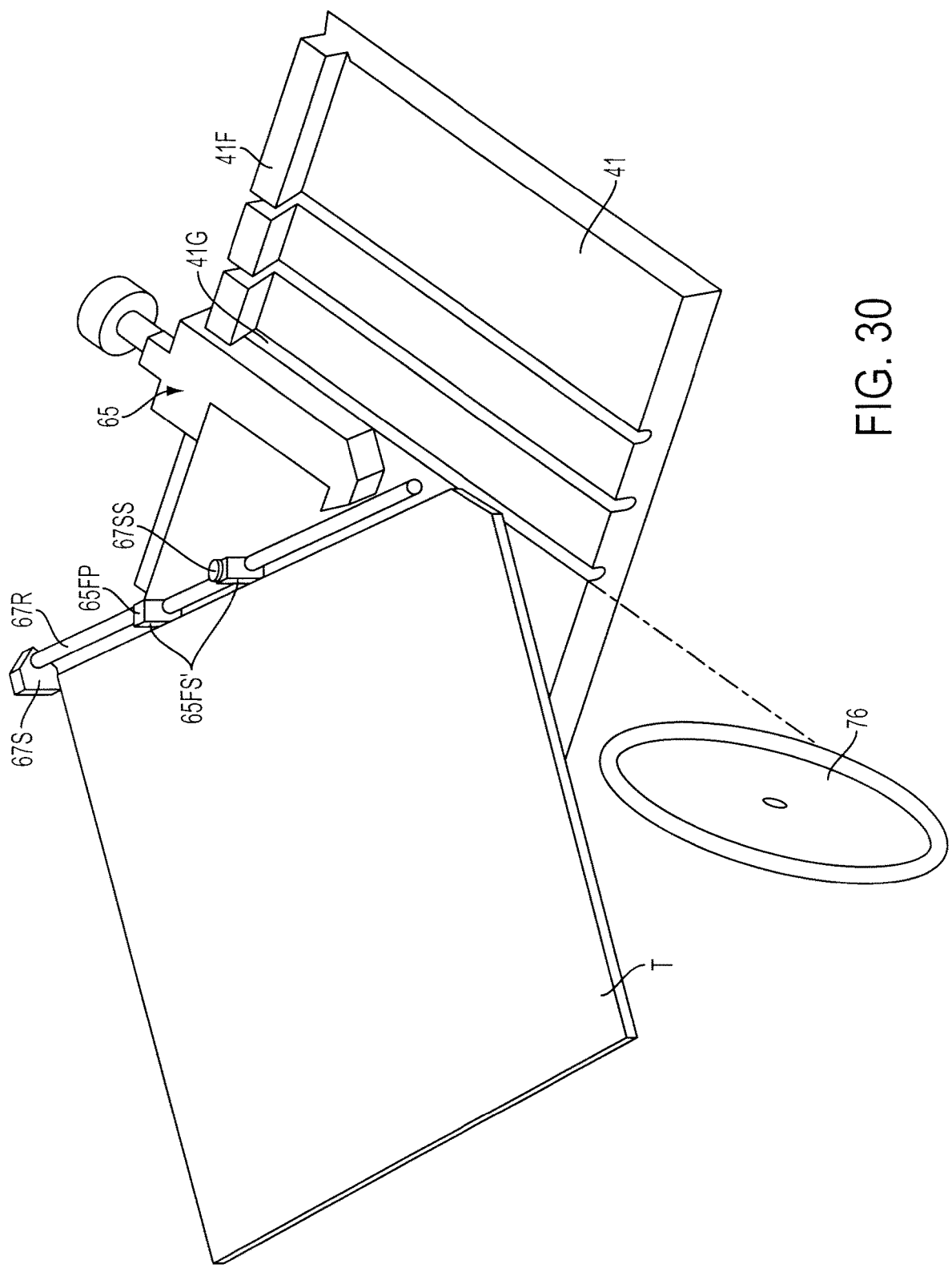
FIG. 30 is a perspective view of a second embodiment of the stop assembly for the angle guide clamping mechanism.

Another embodiment of a stop assembly is shown in FIG. 30. In this embodiment, angled fence 65F may have two coplanar portions 65FP which define surface 65FS'. A rod 67R may be slidably attached to angled fence 65F and/or portions 65FP. Rod 67R may carry a stop 67S, which would contact the workpiece T. The position of stop 67S may be fixed relative to angled fence 65F via a screw 67SS which is threadingly engaged to portion 65FP and contacts rod 67R.

Referring to FIGS. 1-2, 4 and 12, column assembly 50 may be supported by frame assembly 20. Column assembly 50 in turn may support arm assembly 60.

Column assembly 50 preferably includes a column body 51. Column body 51 is preferably hollow and made of cast aluminum. Ribs 51R may be disposed within column body 51 to increase its strength.

It is preferable to route all the electrical wires necessary to provide power to the motor 78M through column body 51 and arm assembly 60. A plate 52 may be used to cover and/or seal the inner cavity of column body 51 that contain the electrical wires. Plate 52 may also support the incoming power cable 54, which may then extend through the inner cavity of column body 51 and into the arm assembly 60. In addition, plate 52 may also support a power outlet 53, which can be used to power any other electrical device, such as pump 90. Plate 52 may be affixed to column body via screws 52S.

It is preferable to provide a means to ensure proper alignment between the column assembly 50 and arm assembly 60. Accordingly, posts 51W, 51D may be provided on column body 51 and/or arm assembly 60. These posts are received in corresponding holes in arm assembly 60 and/or column body 51.

Preferably the holes receiving posts 51W, 51D are close tolerance holes. In order to allow both posts 51W, 51D to fit in both holes, some side-to-side allowance for one of the holes should be provided. This side-to-side allowance could be achieved by making one of the holes into a slot, or shaping one post, such as post 51D, as a diamond.

Accordingly, the user need only dispose arm assembly 60 unto column body 51. The posts 51W, 51D (and the corresponding holes) enable the user to quickly locate the proper position of column assembly 50 relative to arm assembly 60. Once located, the user need only affix arm assembly 60 to column assembly 50 via screws 51S.

Figure 13A:
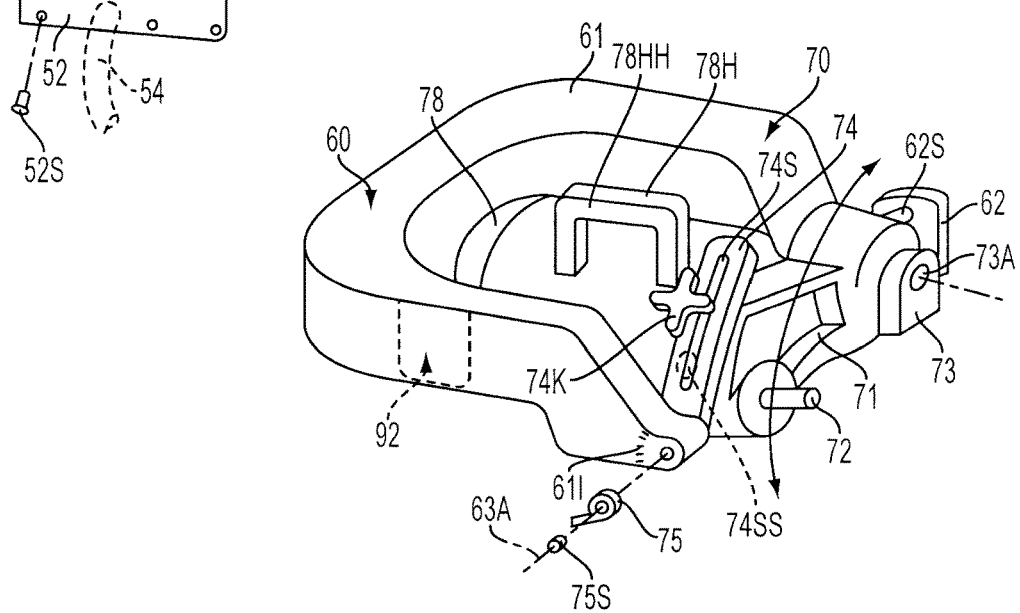
FIGS. 13A-13B are front and rear perspective views, respectively.
Figure 13B:
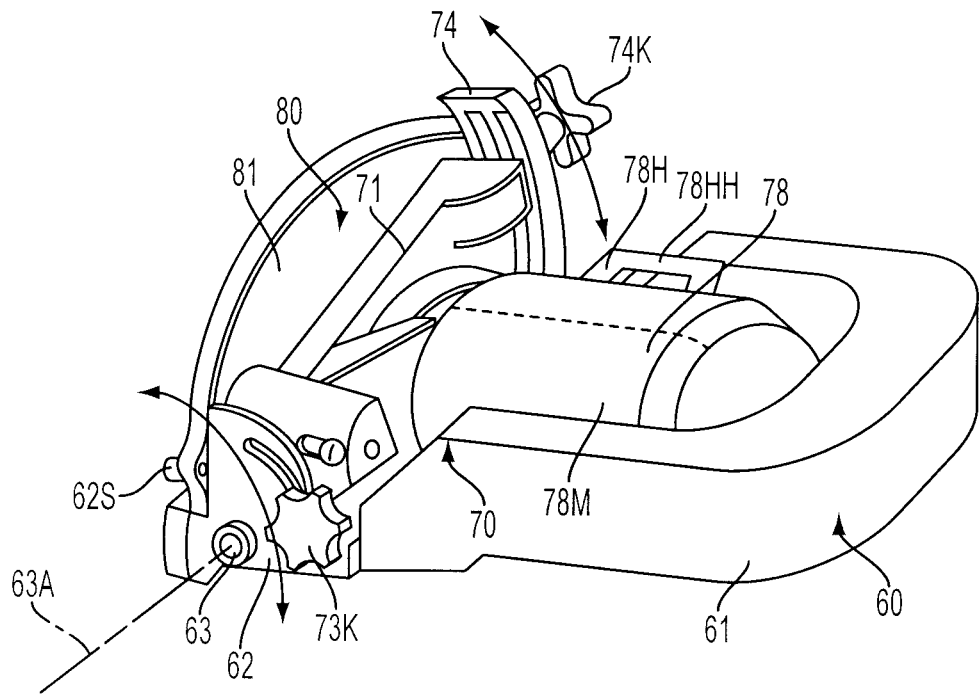

Referring to FIGS. 1-2 and 13, arm assembly 60 preferably has a body 61 which is substantially U-shaped. Preferably arm body 61 is substantially hollow to allow the electrical wires to extend therethrough. Arm body 61 may pivotably support motor assembly 70. Preferably, arm body 61 supports motor assembly 70 at both ends thereof.

Motor assembly 70 preferably comprises a motor 78M and a housing 78 covering motor 78M. Housing 78 may be attached to a pivot arm 71. Motor 78M preferably drives a spindle 72, which carries a cutting wheel 76. Cutting wheel 76 may be partially covered by guard assembly 80, as described more fully below.

Pivot arm 71 preferably has front and rear ends. At the rear end, pivot arm 71 may be pivotably attached to chopping trunnion 73 so that pivot arm 71 (and motor 78M and housing 78) can pivot about axis 73A. Chopping trunnion 73 is preferably pivotably connected to bevel trunnion 63, which in turn may be fixedly connected to arm body 61.

At the front end, pivot arm 71 may be movably connected to front plate 74. Referring to FIGS. 1-2, 13 and 15F, a screw 74KS may be threadingly engaged to pivot arm 71 and/or knob 74K. Front plate 74 in turn may be pivotably attached to the front end of arm body 61.

Preferably, axis 73A is substantially horizontal (at the 0° bevel position). Such arrangement allows the pivot arm 71 (and motor 78M and housing 78) to move downwardly in a chopping action so that a user can cut a tile in a chopping motion, or adjust the depth of cut of the cutting wheel 76. The user can fix the depth of cut of the cutting wheel 76 by rotating knob 74K, which in turn lockingly contacts front plate 74.

Persons skilled in the art should recognize that the user can use knob 74K to pivot the pivot arm 71 (and motor 78M and housing 78) downwardly. Alternatively, housing 78 may have a handle 78H extending therefrom to assist in the chopping operation. Preferably handle 78H has a substantially horizontal portion 78HH for the user to grasp.

Figure 15A:
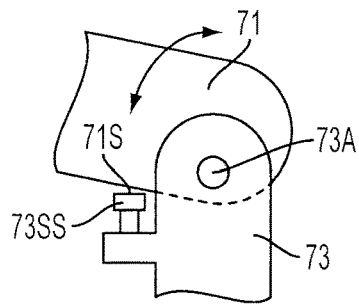
FIGS. 15A-15C and 15E are side views of the first, second, third and fourth embodiments, respectively.
Figure 15B:
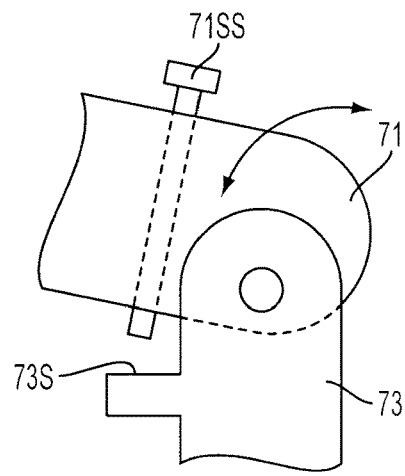

It may be desirable to provide a height adjustment stop mechanism to limit the chopping motion range of cutting wheel 76. Different embodiments of such stop mechanisms are shown in FIG. 15, where like numerals refer to like parts. Referring to FIG. 15A, chopping trunnion 73 may carry a stop 73SS, such as a boss or bolt, which contacts a surface 71S of pivot arm 71. Alternatively, pivot arm 71 may carry a stop 71SS, such as a boss or bolt, which contacts a surface 73S of chopping trunnion 73, as shown in FIG. 15B. In order to adjust the end of the chopping range, the user need only adjust stop 71SS or 73SS.

Figure 15C:
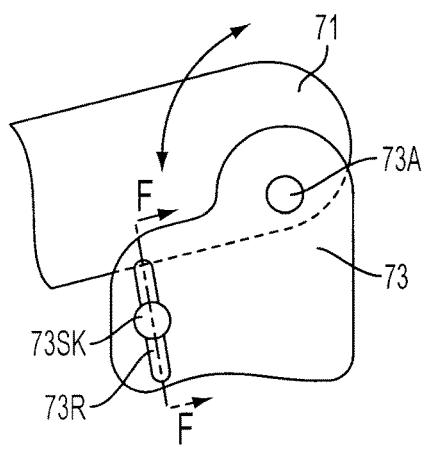
Figure 15D:
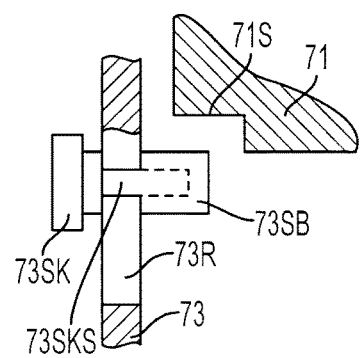
FIG. 15D is a partial cross-sectional view of the third embodiment along line F-F of FIG. 15C.

Another height adjustment stop mechanism is shown in FIGS. 15C-15D, where like numerals refer to like parts. Chopping trunnion 73 may have a slot 73R. A shaft 73SKS may extend through slot 73R. Shaft 73SKS may be threadingly engaged to a knob 73SK and/or a stop 73SS, which would contact surface 71S of pivot arm 71. In order to adjust the end of the chopping range, the user would loosen knob 73SK, move the knob/shaft/stop combination to the desired position and tighten knob 73SK.

Figure 15E:
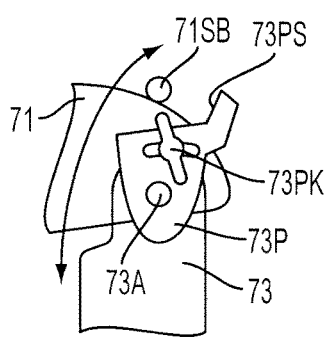

FIG. 15E shows another height adjustment stop mechanism, where like numerals refer to like parts. A plate 73P is preferably attached to chopping trunnion 73. Plate 73P may be pivotally attached to chopping trunnion 73 and is preferably attached so that it pivots about axis 73A. A knob 73PK extending through plate 73P and threadingly engaging chopping trunnion 73 can fix the location of plate 73P. Pivot arm 71 in turn preferably has a stop barrel 71SB, which, as pivot arm 71 is rotated, contacts a surface 73PS of plate 73P. In order to adjust the end of the chopping range, the user would loosen knob 73PK, move the plate 73P to the desired position and tighten knob 73PK.

Figure 15F:
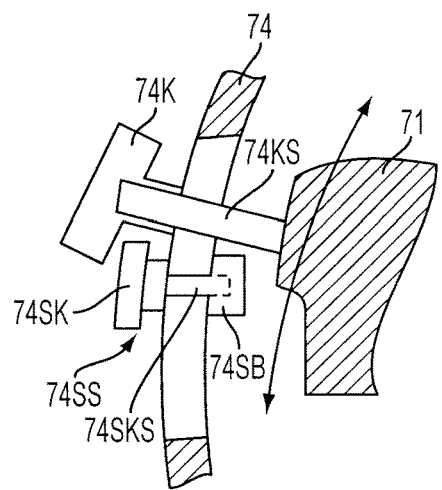
FIG. 15F is a partial cross-sectional view of a fifth embodiment.
Figure 16:
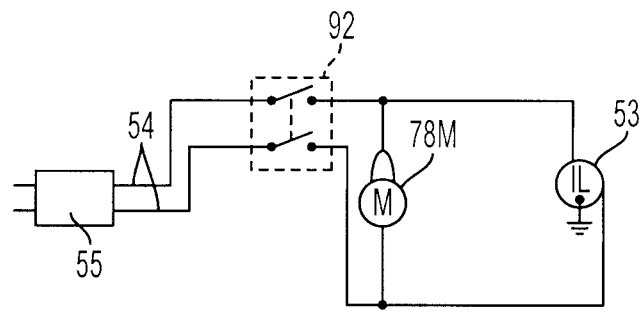
FIG. 16 is a circuit schematic of the tile saw according to the present invention.
Figure 17A:
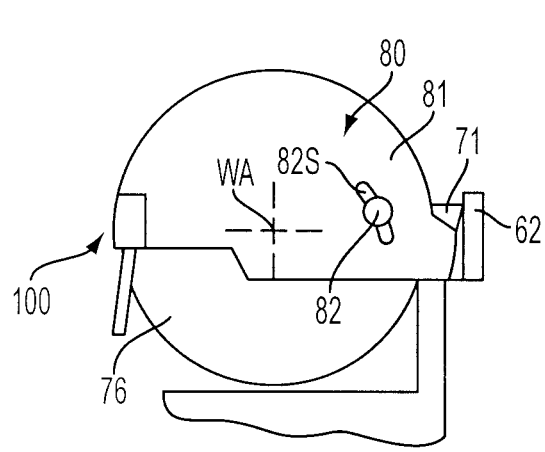
FIGS. 17A-17B show the adjustable guard assembly in two different positions.
Figure 17B:
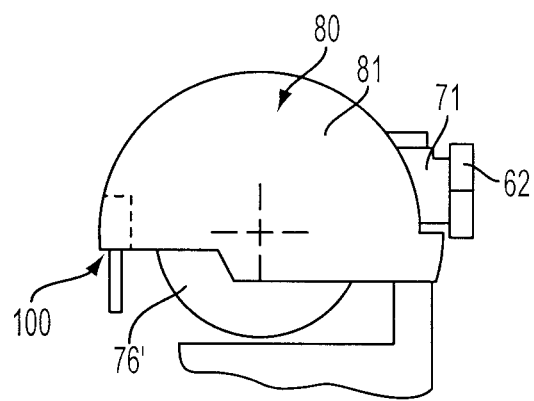
Figure 18A:
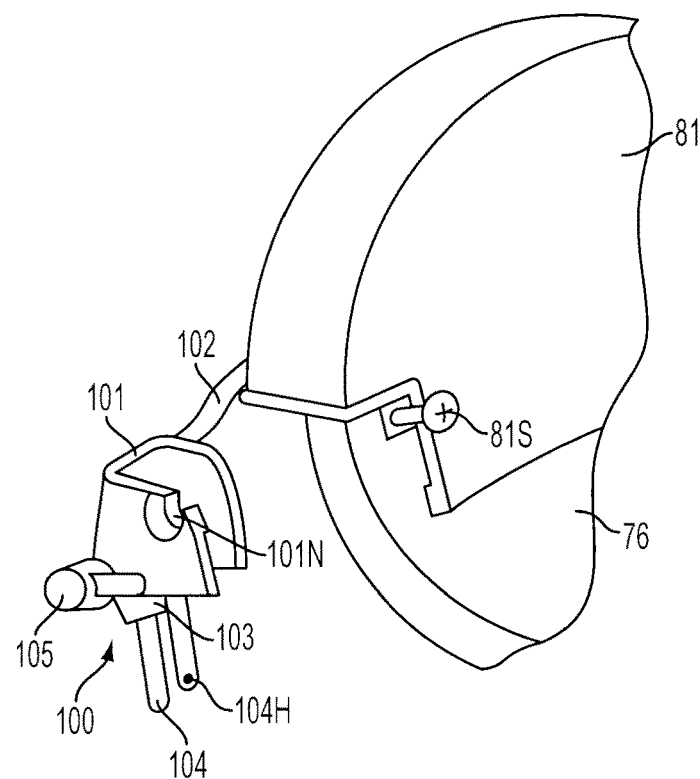
FIGS. 18A-18B show the fluid nozzle assembly in the detached and attached positions, respectively.
Figure 18B:
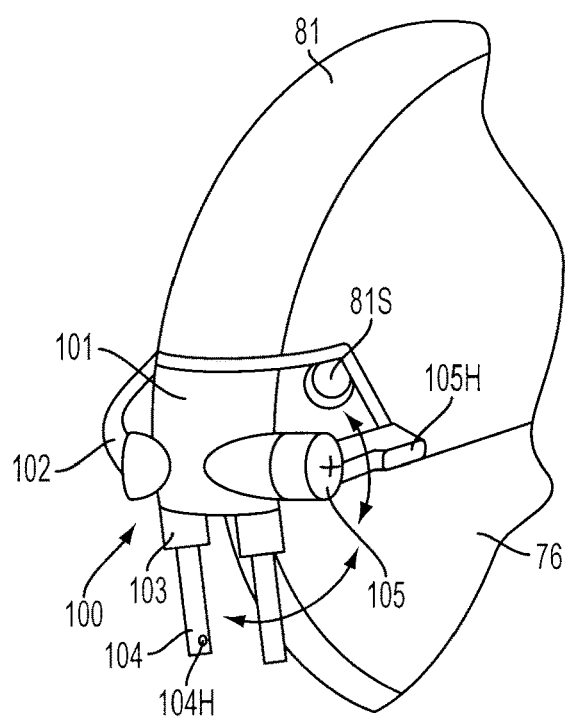

Another height adjustment stop mechanism 74SS is shown in FIG. 15F, where like numerals refer to like parts. A shaft 74SKS may extend through the slot 74S of front plate 74. Shaft 74SKS may be threadingly engaged to a knob 74SK and/or a stop 74SB, which would contact a surface of pivot arm 71 or of shaft 74KS. In order to adjust the end of the chopping range, the user would loosen knob 74SK, move the knob/shaft/stop combination to the desired position and tighten knob 74SK.

Referring to FIGS. 1-2 and 13, persons skilled in the art should recognize that front plate 74, pivot arm 71 and/or chopping trunnion 73 may pivot together about a bevel axis 63A. Such bevel axis 63A may be substantially horizontal and is preferably substantially perpendicular to axis 73A.

Figure 14:
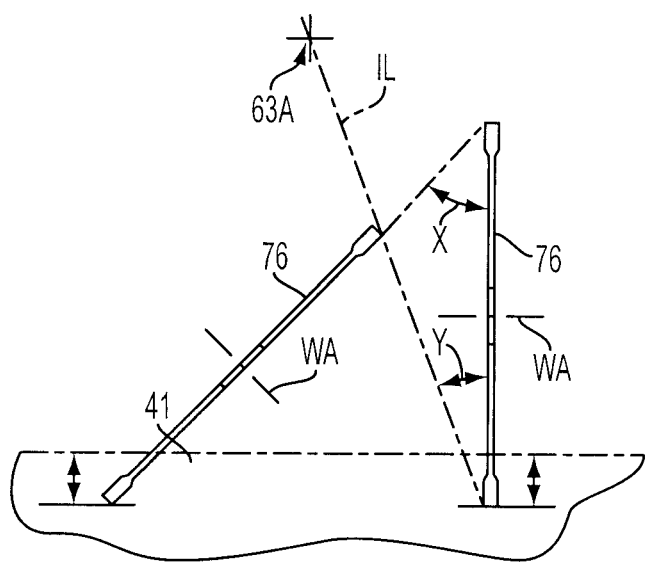
FIG. 14 illustrates the blade at two different bevel positions.

It is preferable that bevel axis 63A not be coplanar with the support surface of table body 41. Furthermore, it is preferable to locate a bevel axis 63A which provides two bevel positions where the distance between the support surface of table body 41 and the end of cutting wheel 76 are substantially equal. Referring to FIG. 14, such bevel axis 63A can be located by first selecting the two bevel positions of cutting wheel 76, and determining the angle difference X between both bevel positions.

In the present embodiment, the two bevel positions are 0° and 45°, whereas angle difference X is 45°. Then, the lowermost corner of cutting wheel 76 when cutting wheel 76 is in the 0° bevel position and which is the corner farthest away from the cutting wheel 76 in the 45° bevel position is selected. An imaginary line IL is drawn from said lowermost corner at an angle Y off the plane containing said lowermost corner and being parallel to cutting wheel 76 when cutting wheel 76 is in the 0° bevel position. Angle Y is preferably half of angle difference X.

Persons skilled in the art will recognize that imaginary line IL intersects the plane of cutting wheel 76 when cutting wheel 76 is in the 45° bevel position at a point above the support surface of table body 41. Bevel axis 63A can then be selected from any point of imaginary line IL, as all points in imaginary line IL will result in a bevel axis where which provides two bevel positions where the distance between the support surface of table body 41 and the end of cutting wheel 76 are substantially equal.

Referring to FIGS. 1-2 and 13, bevel trunnion 63 may include a plate 62 with a slot 62S. A knob 73K extends through slot 62S and threadingly engages chopping trunnion 73. With such arrangement, the user can fix the bevel angle by tightening knob 73K.

A bevel pointer 75 may be attached to the pivot arm 71 and/or front plate 74 via screw 75S so that bevel pointer 75 can pivot jointly therewith. The user can then determine the bevel angle of cutting wheel 76 by looking at the position of bevel pointer 75. Preferably, a bevel angle scale or indicia 611 is disposed on arm body 61 to further assist in the determination of the present bevel angle.

Figure 24A:
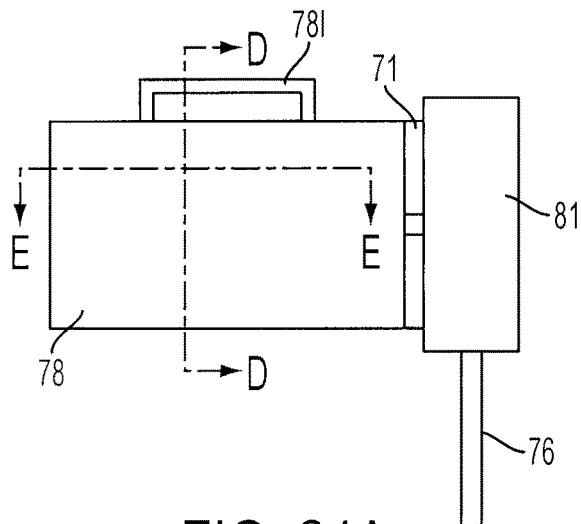
FIG. 24A is a front view of the motor assembly.
Figure 24B:
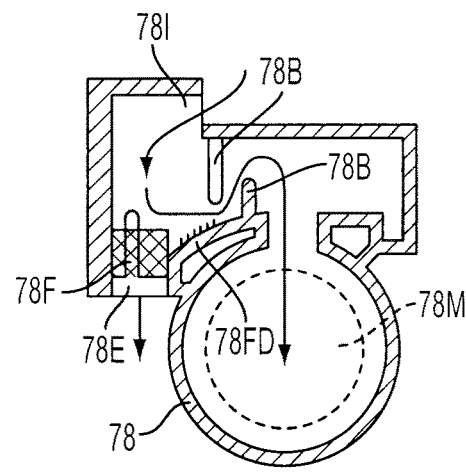
FIGS. 24B-24C are partial cross-sectional views along lines D-D and E-E of FIG. 24A, respectively.
Figure 24C:
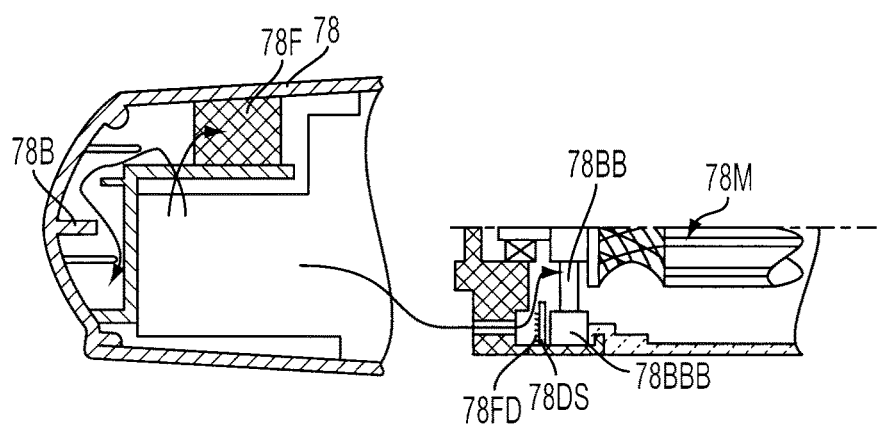

It is preferable to provide an air intake to direct cooling air towards motor 78M. Referring to FIG. 24, motor housing 78 may have an intake 78I disposed on or near the top of motor housing 78, through which air can enter motor housing 78. Persons skilled in the art should recognize that it is preferable to draw cooling air from the area above motor housing 78, rather than the area below motor housing 78, as the concentration of airborne contaminants is lower in the former than in the latter. Intake 78I preferably faces forwardly and/or away from cutting wheel 76, rather than facing cutting wheel 76.

Motor housing 78 may have first baffles 78B disposed internally to cause changes in the direction or velocity of the airflow. Such interruptions in the steady flow of air will preferably separate particulate matter 78FD from the air and/or to fall within motor housing 78 before they reach motor 78M.

It may also be preferable to dispose a second baffle 78DS between the airflow and the brush box 78BBB, which supports a motor brush 78BB which in turn contacts motor 78M. Such second baffle 78DS would collect particulate matter 78FD from the air by redirecting the airflow away from brush box 78BBB.

It may be advantageous to provide a filter 78F somewhere in the airflow. Filter 78F may be made of open cell foam, or other suitable filtering material. Filter 78F may be disposed near a drain 78E, so that any fluid collected by filter 78F can exit motor housing 78 via the drain 78E. Persons skilled in the art will recognize that, even though drain 78E is disposed on a bottom surface of motor housing 78 and that cooling air with a higher concentration of airborne contaminants may come in through drain 78E, such air may be filtered by filter 78F. Persons skilled in the art should also recognize that it is preferable to design filter 78F so that it can easily be removed through drain 78E and/or intake 78I.

Referring to FIGS. 1-2, 12-13 and 16, outlet 53 is preferably disposed in parallel with motor 78M. Outlet 53 and motor 78M preferably receive power via cables 54 which are connected to a plug 55. Preferably, plug 55 is a ground fault circuit interrupt (GFCI) which trips a breaker (thus shutting off power) within about 50 milliseconds if the current exceeds about 5 milliamperes. Persons skilled in the art will recognize that outlet 53 may also be a GFCI outlet.

Switch 92 is preferably a single throw, double pole switch connected to both cables 54 and disposed between plug 55 and outlet 53/motor 78M. It is preferable that switch 92 be placed on arm body 61, so that it remains stationary, even when motor assembly 78 is beveled.

As mentioned above, motor assembly 70 preferably includes guard assembly 80. Referring to FIGS. 1-2, 13 and 17, guard assembly 80 partially covers cutting wheel 76. Guard assembly 80 may include a guard body 81, which partially covers at least the upper portion of cutting wheel 76. Guard body 81 is preferably pivotably attached to pivot arm 71 so that it can rotate about wheel axis WA.

Preferably, guard body 81 has a curved slot 82S, where the radii of the curved slot meet at a center, which is substantially aligned with wheel axis WA. A screw 82 may extend through slot 82S and pivot arm 71 and threadingly engage a knob (not shown). This knob can be rotated to fix the pivotal position of guard body 81 relative to pivot arm 71. This allows guard body 81 to pivot relative to pivot arm 71 to cover the spindle 71 when a smaller cutting wheel (such as 76' in FIG. 17B) is installed thereon. In addition, such arrangement allows the guard body 81 to remain in the same pivotal position relative to cutting wheel 76 regardless of the cutting wheel diameter. This is especially helpful for maintaining the fluid delivery assembly 100, discussed below, aligned with cutting wheel 76.

Referring to FIGS. 1 and 18-21, guard assembly 80 may support fluid delivery assembly 100, which directs water and/or other fluids towards cutting wheel 76 for cooling cutting wheel 76 during the cutting operation. Fluid delivery assembly 100 comprises a hose 102 which is connected to and feeds fluid to a valve body 101.

Valve body 101 may be attached to guard body 81. In particular, valve body 101 may have a notch 101N which receives a screw 81S threadingly engaged to guard body 81. Valve body 101 in turn may send the fluid to two nozzles 104, each nozzle 104 being disposed on opposite sides of cutting wheel 76. Nozzles 104 in turn have holes 104H through which the fluid exits.

Nozzles 104 are preferably carried by a carrier 103, which may be pivotably attached to valve body 101. Carrier 103 may be connected to pivoter 105. This enables the user to rotate nozzles 104 and/or carrier 103 to a desired position towards or away from cutting wheel 76 by rotating pivoter 105. Pivoter 105 preferably has a handle 105H to facilitate such rotation.

Preferably, nozzles 104 and/or carrier 103 can be biased away from cutting wheel 76 so that the fluid exiting through holes 104H does not contact cutting wheel 76. This placement advantageously reduces the amount of fluid misting.

Figure 19:
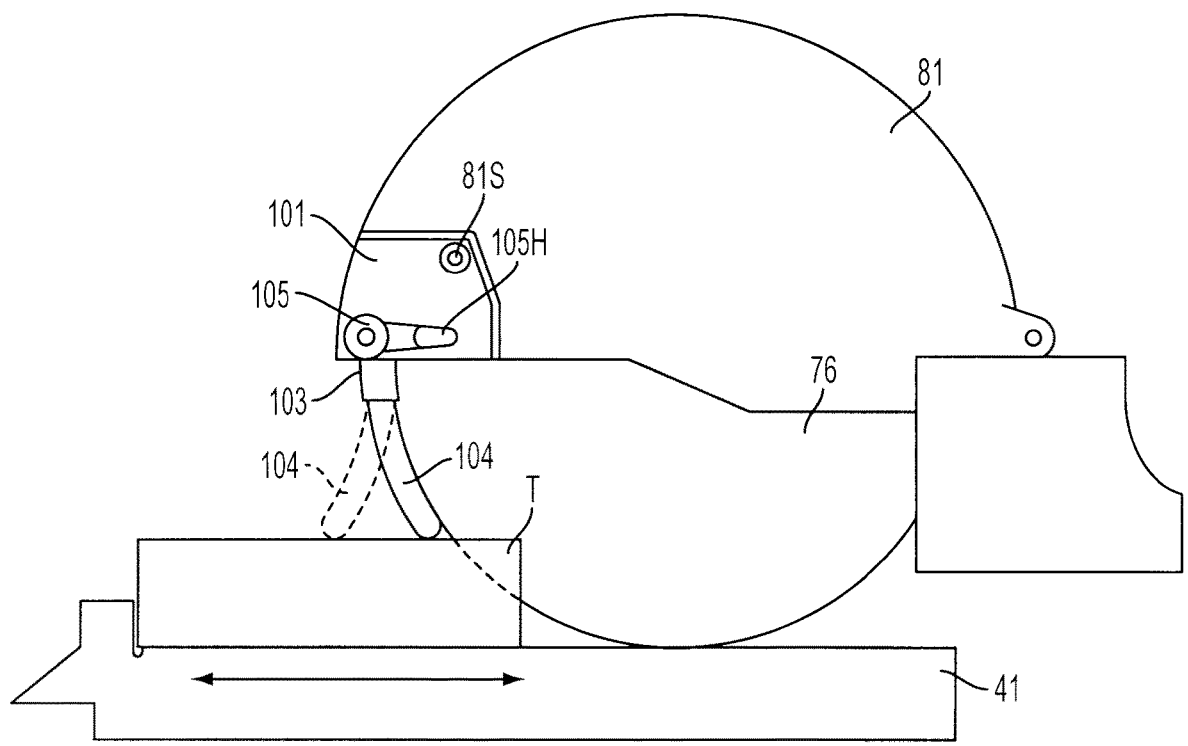
FIG. 19 is a side view of the tile saw with a flexible nozzle assembly according to the present invention.

It is preferable that nozzles 104 may be made of an elastic or resilient material such that, when a workpiece T is pushed into contact with cutting wheel 76, workpiece T flexes nozzles 104 as shown in FIG. 19, so the exiting fluid can contact and/or cool cutting wheel 76. Making nozzles 104 of an elastic or resilient material may also prevent damage to nozzles 104 and/or fluid delivery assembly 100 when the workpiece T is returned to the original position as nozzles 104 would safely flex out of the way, as shown in the broken line position in FIG. 19.

Figure 20A:
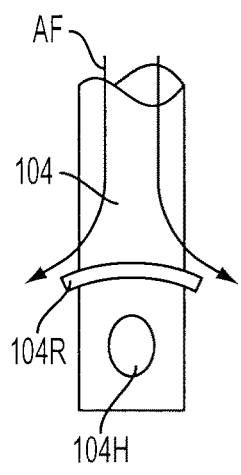
FIGS. 20A-20B are front and side views of the nozzle assembly, respectively.
Figure 20B:
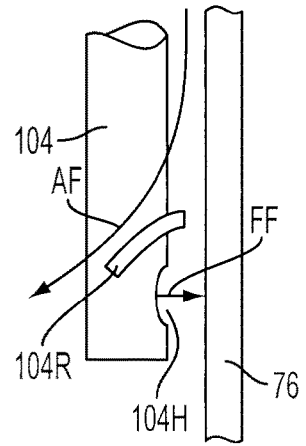
Figure 21:
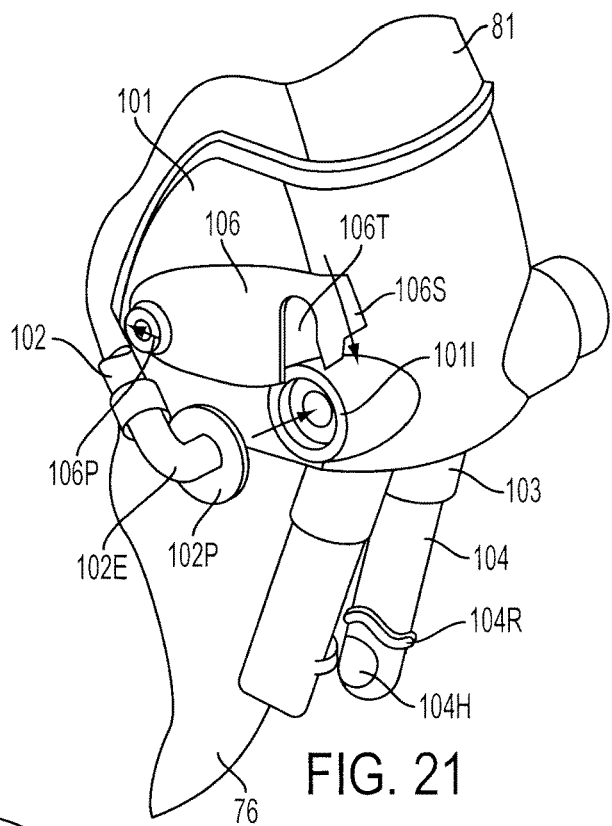
FIG. 21 is a partial perspective view of the fluid nozzle assembly with a detached hose.

Referring to FIGS. 20-21, each nozzle 104 may have a rib 104R protruding therefrom. Rib 104R is preferably disposed above hole 104H to redirect the air flow AF created by the rotating cutting wheel 76. Such redirection allows the fluid flow FF exiting through nozzle hole 104H to remain in a laminar-type flow until it contacts cutting wheel 76 without disturbance from air flow AF, thus reducing fluid misting.

It is preferable to provide an easy means for separating hose 102 from valve body 101. Referring to FIG. 21, hose 102 may include an elbow 102E, which has a plate 102P. Plate 102P can be inserted into an input 101I of valve body 101. A plate 106 rotatably attached to valve body 101 may have a slot 106S which captures plate 102P to maintain hose 102 connected to valve body 101. Persons skilled in the art will recognize that plate 106 may be rotatable attached to valve body 101 via a screw 106P. Persons skilled in the art may also recognize that it is preferable to provide plate 106 with a tab 106T to enable the user between the retaining position and the plate bypassing position shown in FIG. 21.

Figure 22:
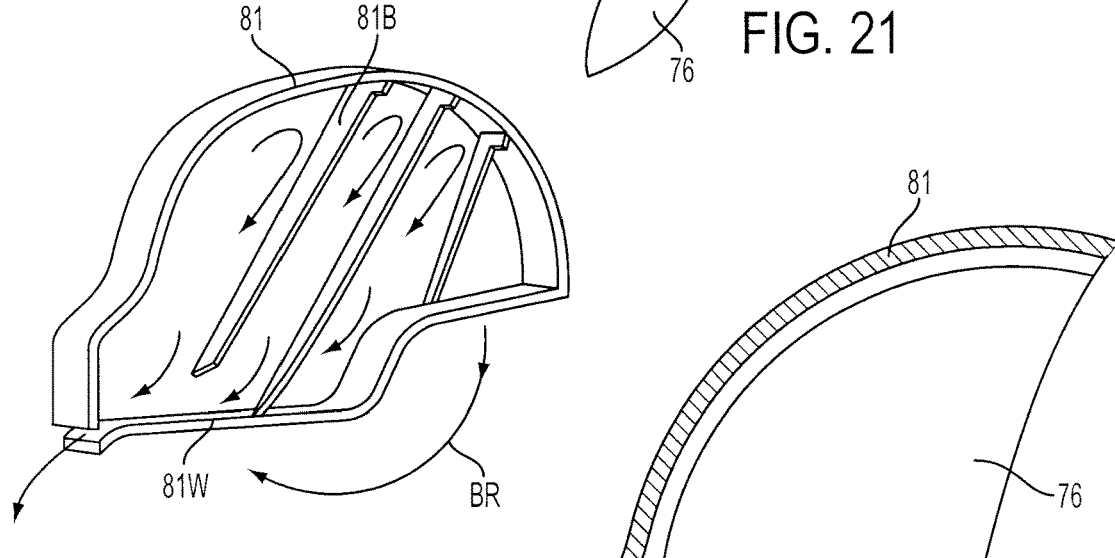
FIG. 22 is a perspective view of a portion of the guard assembly.
Figure 23:
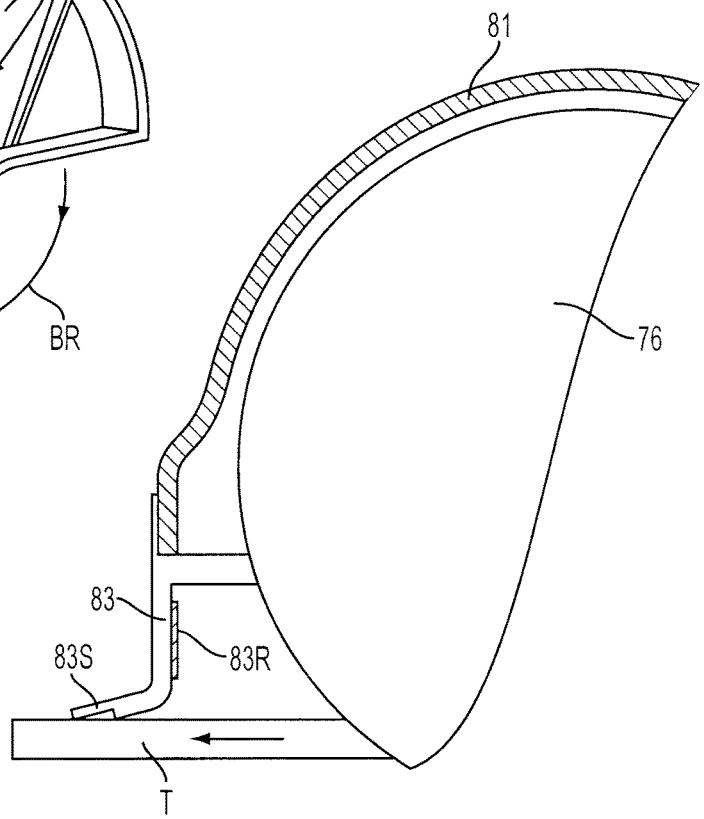
FIG. 23 is a partial cross-sectional view of the guard assembly with a flap assembly.

Guard assembly 80 may also have other means for controlling fluid flow. For example, referring to FIG. 22, guard body 81 may have internal baffles 81B and/or a bottom wall 81W, which may be disposed as close as possible to cutting wheel 76. As cutting wheel 76 rotates along path BR, it carries fluid, fluid spray and/or mist. Internal baffles 81B and/or bottom wall 81W catch the fluid, spray and/or mist off the rotating cutting wheel 76 and redirect such fluid to the rear of guard body 81, where it can be released into base 11.

Guard assembly 80 may also have a flapper 83 attached to guard body 81. Flapper 83 may be made of rubber. Flapper 83 preferably has an upper portion 83R with substantially vertical ribs and a lower portion 83S without ribs. Such arrangement is advantageous as the ribs on the upper portion reduces the amount of mist created when fluid strikes flapper 83, whereas the lower portion 83S can lay flush on workpiece T and act as a wiper.

Persons skilled in the art may recognize other alternatives to the means disclosed herein. However, all these additions and/or alterations are considered to be equivalents of the present invention.

What is claimed is:

1. An angle guide assembly for being coupled to a table body that slides along a longitudinal axis relative to a base of a saw, the angle guide assembly comprising:
   an attachment member configured to attach the angle guide assembly to the table body;
   a guide body defining a pivot axis parallel to the longitudinal axis, the guide body having a first guide surface on a first side of the pivot axis and lying in a first plane parallel to the pivot axis, and a second guide surface parallel to the first guide surface on a second side of the pivot axis different from the first side, and lying in a second plane parallel to the pivot axis; and
   an angled fence pivotally coupled to the guide body, the angled fence having a fence surface;
   wherein the angled fence is pivotable about the pivot axis between a first orientation wherein the fence surface is disposed on the first side of the pivot axis in which a workpiece can be placed at an angle to the longitudinal axis against the fence surface and the angled fence covers the first guide surface, and a second orientation wherein the fence surface is disposed on the second side of the pivot axis in which the workpiece can be placed at an angle to the longitudinal axis against the fence surface and the angled fence covers the second guide surface,
   wherein in the first orientation, the workpiece can be placed parallel to the longitudinal axis by placing the workpiece against the second guide surface, and
   wherein in the second orientation, the workpiece can be placed parallel to the longitudinal axis by placing the workpiece against the first guide surface.

2. The angle guide assembly of claim 1, wherein the longitudinal axis is parallel to a cutting line of the saw.

3. The angle guide assembly of claim 1, wherein the attachment member comprises a screw clamp for attaching the guide body to a fence on the table body.

4. The angle guide assembly of claim 3, wherein the screw clamp comprises a recess for receiving the fence and a threaded clamping bolt for clamping the guide body to the fence.

5. The angle guide assembly of claim 4, wherein the threaded clamping bolt includes a plate at an end of the bolt for engaging the fence.

6. The angle guide assembly of claim 5, wherein the plate comprises a spring metal.

7. The angle guide assembly of claim 1, wherein the angled fence comprises a substantially triangular member.

8. The angle guide assembly of claim 1, further comprising a rod that extends parallel to the fence surface, the rod being fitted with a stop member at one end to contact an end portion of the workpiece.

9. The angle guide assembly of claim 1, wherein the fence surface is disposed at an acute angle with respect to the pivot axis.

10. The angle guide assembly of claim 1 wherein the second guide surface is on a laterally opposite side of the guide body from the first guide surface.

11. A saw comprising:
    a base;
    a rail disposed on the base, the rail having a longitudinal axis;
    a table body having at least one bearing that rides along the rail to enable the table body to slide relative to the base in a direction of the longitudinal axis;
    a support assembly disposed on the base and supporting a saw assembly above the table body, the saw assembly comprising a motor, and a cutting wheel driven by the motor; and
    an angle guide assembly including:
       a guide body defining a pivot axis parallel to the longitudinal axis, the guide body having a first guide surface on a first side of the pivot axis and lying in a first plane parallel to the pivot axis, and a second guide surface parallel to the first guide surface on a second side of the pivot axis different from the first side, and lying in a second plane parallel to the pivot axis; and
       an angled fence pivotally coupled to the guide body and pivotable with respect to the table body, the angled fence having a fence surface,
       wherein the angled fence is pivotable about the pivot axis between a first orientation wherein the fence surface is disposed on the first side of the pivot axis in which a workpiece can be placed at an angle to the longitudinal axis against the fence surface, and a second orientation wherein the fence surface is disposed on the second side of the pivot axis in which the workpiece can be placed at an angle to the longitudinal axis against the fence surface, and
       wherein in the first orientation, the workpiece can be placed parallel to the longitudinal axis by placing the workpiece against the second guide surface, and
       wherein in the second orientation, the workpiece can be placed parallel to the longitudinal axis by placing the workpiece against the first guide surface.

12. The saw of claim 11, wherein the pivot axis is parallel to the longitudinal axis.

13. The saw of claim 11, wherein the guide body comprises a screw clamp for attaching the guide body to a fence of the table body.

14. An angle guide assembly for being coupled to a table body that slides along a longitudinal axis relative to a base of a saw, the angle guide assembly comprising:
    an attachment member configured to attach the angle guide assembly to the table body;
    a guide body defining a pivot axis parallel to the longitudinal axis, the guide body having a first guide surface on a first side of the pivot axis and a second guide surface parallel to the first guide surface on a second side of the pivot axis different from the first side; and
    an angled fence pivotally coupled to the guide body, the angled fence having a fence surface;
    wherein the angled fence is pivotable about the pivot axis between a first orientation wherein the fence surface is disposed on the first side of the pivot axis in which a workpiece can be placed at an angle to the longitudinal axis against the fence surface and the angled fence covers the first guide surface, and a second orientation wherein the fence surface is disposed on the second side of the pivot axis in which the workpiece can be placed at an angle to the longitudinal axis against the fence surface and the angled fence covers the second guide surface, wherein the attachment member comprises a screw clamp for attaching the guide body to a fence on the table body, and wherein the screw clamp comprises a recess for receiving the fence and a threaded clamping bolt for clamping the guide body to the fence.

15. A saw comprising:

a base;

a rail disposed on the base, the rail having a longitudinal axis;

a table body having at least one bearing that rides along the rail to enable the table body to slide relative to the base in a direction of the longitudinal axis;

a support assembly disposed on the base and supporting a saw assembly above the table body, the saw assembly comprising a motor, and a cutting wheel driven by the motor; and an angle guide assembly including:

a guide body defining a pivot axis parallel to the longitudinal axis, the guide body having a first guide surface on a first side of the pivot axis and a second guide surface parallel to the first guide surface on a second side of the pivot axis different from the first side; and an angled fence pivotally coupled to the guide body and pivotable with respect to the table body, the angled fence having a fence surface, wherein the angled fence is pivotable about the pivot axis between a first orientation wherein the fence surface is disposed on the first side of the pivot axis in which a workpiece can be placed at an angle to the longitudinal axis against the fence surface, and a second orientation wherein the fence surface is disposed on the second side of the pivot axis in which the workpiece can be placed at an angle to the longitudinal axis against the fence surface, and wherein the guide body comprises a screw clamp for attaching the guide body to a fence of the table body.

* * * * *